United States Patent
Burns et al.

(10) Patent No.: US 11,734,789 B2
(45) Date of Patent: Aug. 22, 2023

(54) SYSTEMS AND METHODS FOR IMAGE DISTORTION CORRECTION

(71) Applicant: Immersive Tech, Inc., Tampa, FL (US)

(72) Inventors: Micheal Woodrow Burns, Sarasota, FL (US); Jon Clagg, Tampa, FL (US); Kunal Bansal, Tampa, FL (US)

(73) Assignee: Immersive Tech, Inc., Tampa, FL (US)

( * ) Notice: Subject to any disclaimer, the term of this patent is extended or adjusted under 35 U.S.C. 154(b) by 49 days.

(21) Appl. No.: 17/244,701

(22) Filed: Apr. 29, 2021

(65) Prior Publication Data

US 2021/0374921 A1    Dec. 2, 2021

Related U.S. Application Data

(60) Provisional application No. 63/033,762, filed on Jun. 2, 2020.

(51) Int. Cl.
  *G06T 3/00*   (2006.01)
  *G06T 7/80*   (2017.01)
  *G06T 5/00*   (2006.01)
  *G06T 5/20*   (2006.01)

(52) U.S. Cl.
  CPC ............ *G06T 3/0062* (2013.01); *G06T 5/006* (2013.01); *G06T 5/20* (2013.01); *G06T 7/80* (2017.01)

(58) Field of Classification Search
  CPC .. G06T 7/80; G06T 5/006; G06T 5/20; G06T 3/0062; G06V 10/22
  See application file for complete search history.

(56) References Cited

U.S. PATENT DOCUMENTS

| | | | |
|---|---|---|---|
| 5,796,426 A * | 8/1998 | Gullichsen | G06T 3/0018 382/293 |
| 7,623,677 B2 | 11/2009 | Girgensohn et al. | |
| 9,699,465 B2 | 7/2017 | Ouedraogo et al. | |
| 9,928,393 B1 | 3/2018 | Barnum | |
| 9,936,249 B1 | 4/2018 | Nelson et al. | |
| 10,402,781 B2 | 9/2019 | Terwilliger et al. | |
| 10,839,568 B2 * | 11/2020 | Ashok | G06T 3/40 |
| 10,986,337 B2 | 4/2021 | Burns et al. | |
| 11,196,929 B2 * | 12/2021 | Okiyama | H04N 5/23258 |
| 2004/0174366 A1 | 9/2004 | Lenger et al. | |
| 2005/0105608 A1 | 5/2005 | Coleman et al. | |
| 2006/0280376 A1 * | 12/2006 | Lei | H04N 3/2335 348/E3.045 |

(Continued)

OTHER PUBLICATIONS

Yang et al., Correct a particular fisheye lens distortion quickly using the coordinate map table, International Conference on Image Processing and Pattern Recognition in Industrial Engineering, 2010, (Year: 2010).*

(Continued)

*Primary Examiner* — Andrae S Allison
(74) *Attorney, Agent, or Firm* — KPPB LLP

(57) ABSTRACT

Systems and methods for correcting image distortion in accordance with embodiments of the invention are illustrated. One embodiment includes a method for correcting distorted images. The method includes steps for receiving a set of term coefficients associated with a lens that captured a set of one or more distorted images, and mapping each of the set of distorted images to a new target image based on the set of term coefficients.

19 Claims, 20 Drawing Sheets

(56) References Cited

U.S. PATENT DOCUMENTS

| | | | |
|---|---|---|---|
| 2007/0025636 A1* | 2/2007 | Furukawa | G06T 1/60 |
| | | | 382/275 |
| 2007/0188633 A1* | 8/2007 | Mandy | G06T 3/0018 |
| | | | 348/E5.079 |
| 2013/0127861 A1 | 5/2013 | Gollier | |
| 2015/0312468 A1 | 10/2015 | Taylor et al. | |
| 2015/0334398 A1 | 11/2015 | Socek et al. | |
| 2015/0350714 A1 | 12/2015 | Normile et al. | |
| 2016/0019428 A1 | 1/2016 | Renner et al. | |
| 2016/0065946 A1 | 3/2016 | Cole et al. | |
| 2016/0323561 A1 | 11/2016 | Jin et al. | |
| 2017/0068311 A1 | 3/2017 | Evans et al. | |
| 2017/0118540 A1 | 4/2017 | Thomas et al. | |
| 2017/0199099 A1* | 7/2017 | Chen | G01M 11/0207 |
| 2017/0339392 A1 | 11/2017 | Forutanpour et al. | |
| 2018/0199024 A1 | 7/2018 | Yip | |
| 2019/0102868 A1* | 4/2019 | Beric | G06T 5/006 |
| 2019/0222823 A1 | 7/2019 | Clagg et al. | |
| 2019/0259124 A1 | 8/2019 | Barnett | |
| 2021/0058616 A1 | 2/2021 | Burns et al. | |
| 2021/0067758 A1 | 3/2021 | Choi et al. | |
| 2021/0375000 A1 | 12/2021 | Burns et al. | |

OTHER PUBLICATIONS

Sahin, F. E., and A. R. Tanguay. "Distortion optimization for wide-angle computational cameras." Optics Express 26.5 (2018): 5478-5487. (Year: 2018).*

Yumak, "Virtual Reality and Presence", Universiteit Utrecht, lecture presentation, 2018, 69 pages.

Asari et al., "A New Approach for Nonlinear Distortion Correction in Endoscopic Images Based on Lease Square Estimation", IEEE Transactions on Medical Imaging, Apr. 1999, vol. 18, No. 4, pp. 345-354.

Bogner et al., "Photographic lenses projections: computational models, correction, conversion . . . ", Projection models, printed from michael.thoby.free.fr/Fisheye_history_short/Projections/Fisheye_prrojection-models.html on Apr. 8, 2021, published Nov. 23, 2012, 6 pgs.

Bourke, "Omni-directional Stereoscopic Fisheye Images for Immersive Hemispherical Dome Environments", Computer Games and Allied Technology, 2009, 6 pgs.

Bye, "NextVR and the Future of Immersive Sports Live-Streaming", Retrieved from https://www.roadtovr.com/nextvr-future-immersive-sports-live-streaming/, published Apr. 3, 2016, 3 pages.

Chang et al., "Rectangling Stereographic Projection for Wide-Angle Image Visualization", Proceedings of the IEEE International Conference on Computer Vision, 2013, 8 pgs.

Gunkel et al., "WebVR Meets WebRTC: Towards 360-Degree Social VR Experiences", In Virtual Reality (VR), IEEE, 2017, pp. 457-458.

Hughes et al., "Review of Geometric Distortion Compensation in Fish-Eye Cameras", ISSC Jun. 18-19, 2008, Galway, 6 pages.

Hughes et al., "Validation of Polynomial-based Equidistance Fish-Eye Models", ISSC, Jun. 10-11, 2009, UCD, 6 pgs.

Keselman, "What's the best lens for stereo? An exploration of lens models and their stereoscopic depth performance", Stanford University, Published in 2016, 8 pgs.

Kheng, "Image Warping and Morphing", CS5245 Vision & Graphics for Special Effects, CS5245 Vision & Graphics for Special Effects, 31 pgs.

Konrad et al., "SpinVR: Towards Live-Streaming 3D Virtual Reality Video", ACM Transactions on Graphics (TOG) vol. 36, No. 6, Article 208, Nov. 2017, 12 pgs., https://doi.org/10.1145/3130800.3130836.

Lang, "NextVr's Latest Tech is Bringing New Levels of Fidelity to VR Video", Retrieved from https://www.roadtovr.com/nextvr-latest-tech-is-bringing-new-levels-of-fidelity-to-vr-video/, Published Feb. 8, 2018, Printed Jan. 3, 2019, 6 pgs.

Liu et al., "Automatic Image Retargeting with Fisheye-View Warping", UIST 2005, Oct. 23-27, 2005, 10 pgs.

Liu et al., "Critical Assessment of Correction Methods for Fisheye Lens Distortion", The international Archives of the Photogrammetry, Remote Sensing and Spatial Information Sciences, Jul. 12-19, 2016, vol. XLI-B1, XXIII ISPRS Congress, pp. 221-228.

Ma et al., "A Family of Simplified Geometric Distortion Models for Camera Calibration", arXiv:cs/0308003 [cs.CV], Aug. 12, 2003, 14 pgs.

Moynihan, "The NFL's New VR Highlights Take Football to a Whole New Level", Retrieved from https://www.wired.com/2016/12/nextvr-nfl-game-highlights/, published Dec. 11, 2016, printed Jan. 3, 2019, 14 pgs.

Pereira, "Calibration of Catadioptric Vision Systems", Thesis, Jul. 2012, 104 pgs.

Prins et al., "TogetherVR: A Framework for Photo-Realistic Shared Media Experiences in 360-Degree VR", TNO, The Netherlands, IBC 2017, 8 pgs.

Rhody, "Lecture 17: Geometric Image Transformations", Chester F. Carlson for Imaging Science, Rochester Institute of Technology, Nov. 11, 2004, 39 pgs.

Rowell, "Calibrating a VR Camera", IEEE Consumer Electronics Society, Jun. 2015, 24 pgs.

Sarconi, "3-D Tv Tech Finally Finds Good Use Streaming NBA Action in Virtual Reality", Retrieved from https://www.wired.com/2017/04/nextvr-nba/, published Apr. 15, 2017, printed Jan. 3, 2019, 11 pgs.

Schneider et al., "On the Accuracy of Dense Fisheye Stereo", IEEE Robotics and Automation Letters 1, No. 1, 2016, 8 pgs.

Vass et al., "Applying and removing lens distortion in post production", Colorfront Ltd., 2003, 8 pgs.

Wang et al., "Fisheye live streaming: A study of the dewarping function and the performance of the streaming", Thesis, 2018, 66 pgs.

* cited by examiner

| | | | | | |
|---|---|---|---|---|---|
| 3rd Degree Polynomials | GPMC-x | -1558.521306 | 8.725128729 | | |
| | GPMC-y | 387.1868095 | 178.3217994 | | |
| | | -160.1537809 | -700.0463914 | | |
| | | -27.53390053 | 183.4740686 | | |
| 5th Degree Polynomials | GPMC-x | 13116.75197 | -2548.506195 | 6.576482558 | |
| | | -5341.649333 | -481.2775067 | -2.200552751 | |
| | | 514.2124254 | 279.7406134 | 180.1577468 | |
| | GPMC-y | 4297.396481 | 3767.720117 | 560.3829444 | |
| | | -853.60087 | -1007.57747 | -576.2825764 | |
| | | -14.58756271 | 4.357042813 | 179.7575816 | |
| 7th Degree Polynomials | GPMC-x | -115683.3997 | 43262.42304 | -3747.968061 | 4.911317961 |
| | | 66974.71891 | -11415.04202 | 434.8333102 | -2.379269981 |
| | | -11963.54667 | -1039.086741 | 850.1604296 | 0.3428774 |
| | GPMC-y | 614.9378095 | 296.4382804 | 298.3324099 | 179.9868692 |
| | | -60746.65462 | -17233.87885 | 9682.701499 | -613.9242332 |
| | | 22968.03706 | 9517.741835 | 492.6198484 | -349.6109534 |
| | | -2005.103593 | -1274.296136 | -732.0974983 | -594.1055524 |
| | | -7.853303306 | 3.750064321 | -0.516605441 | 180.0170836 |

FIG. 12

SYSTEMS AND METHODS FOR IMAGE DISTORTION CORRECTION

CROSS-REFERENCE TO RELATED APPLICATIONS

The current application claims priority to U.S. Provisional Patent Application Ser. No. 63/033,762, entitled "Systems and Methods for Image Distortion Correction", filed Jun. 2, 2020. The disclosure of Application Ser. No. 63/033,762 is hereby incorporated by reference in its entirety.

FIELD OF THE INVENTION

The present invention generally relates to distortion correction and, more specifically, polynomial-based methods for distortion correction.

BACKGROUND

Image distortion can arise in many different cases. One type of image distortion can be caused by lenses with extended fields of view (e.g., wide-angle or fisheye lenses). Fisheye lenses can be used for various purposes, such as in photography, videography, and in the generation of 3D experiences (e.g., stereoscopic video). However, in many applications, it can often become necessary to correct the distortion caused by the extended fields of view. Conventional methods of converting fisheye to rectangular coordinates often require converting several times and passing through intermediary coordinate systems (e.g., R3 and spherical) before projecting back down to R2 in order to approximate the physical properties of light.

SUMMARY OF THE INVENTION

Systems and methods for correcting image distortion in accordance with embodiments of the invention are illustrated. One embodiment includes a method for correcting distorted images. The method includes steps for receiving a set of term coefficients associated with a lens that captured a set of one or more distorted images, and mapping each of the set of distorted images to a new target image based on the set of term coefficients.

In a further embodiment, the set of term coefficients are generalized term coefficients, the method further includes computing specific term coefficients based on a field of view of the lens, and mapping each of the set of distorted images is based on the specific term coefficients.

In still another embodiment, the method further includes steps for generating the set of term coefficients by generating a set of coordinate maps, fitting a set of mapping functions to mapping slices of the coordinate maps, fitting a set of mapping coefficient curves to coefficients of the set of mapping functions, and determining the set of term coefficients based on coefficients of the set of mapping coefficient curves.

In a still further embodiment, mapping slices are rows of a coordinate map.

In yet another embodiment, the set of mapping coefficient curves include at least one of the group consisting of a quartic polynomial and a quintic polynomial.

In a yet further embodiment, the set of mapping coefficient curves are centered around the origin.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 11 conceptually illustrates a process for correcting distorted images in accordance with an embodiment of the invention.

FIG. 12 illustrates examples of source coordinate sets for different degree polynomials.

DETAILED DESCRIPTION

Turning now to the drawings, systems and methods for the correction of distorted images are disclosed. In some cases, distortion correction involves mapping pixels from a source (e.g., distorted) image to a target (e.g., undistorted) image. The mapping can be used to determine which pixels from a source image should be used for each pixel in the target image. Although many of the examples described herein describe distortion correction for fisheye images, one skilled in the art will recognize that similar systems and methods can be used in various other image mapping applications, without departing from this invention.

Systems and methods in accordance with some embodiments of the invention can be used to determine an approximation to other methods of distortion mapping that uses polynomials to perform the mappings on the x- and y-coordinates. These polynomials do not involve trig functions, or square roots but use only multiplication, addition, and subtraction. The result is a mapping that is virtually indistinguishable from more complicated conventional methods, while also providing a performance boost since the graphical processing unit (GPU) is not being asked to do nearly as much work with complicated and costly functions. In certain embodiments, the mapping is represented as a set of source coordinate coefficients that can be used for a source coordinate function that takes the target coordinates as inputs and returns the corresponding coordinates from the source image.

In certain embodiments, source coordinate coefficients can be determined by fitting mapping functions to mapping slices of coordinate maps, fitting term functions to mapping coefficient curves that are based on the fitted mapping functions, and computing source coordinate coefficients based on the term coefficients of the term functions. Source coordinate coefficients in accordance with certain embodiments of the invention can be determined based on coordinate maps between the warped and dewarped images. In various embodiments, coordinate maps can be generated using theoretical models used in conventional dewarping methods. Coordinate maps in accordance with various embodiments of the invention can be determined from the mappings between source and destination points using a theoretical fisheye correction model. The mappings are applied to input image (captured from the wide-angle or fisheye camera) to produce an output image which is corrected for the fisheye distortion.

Figure 1:
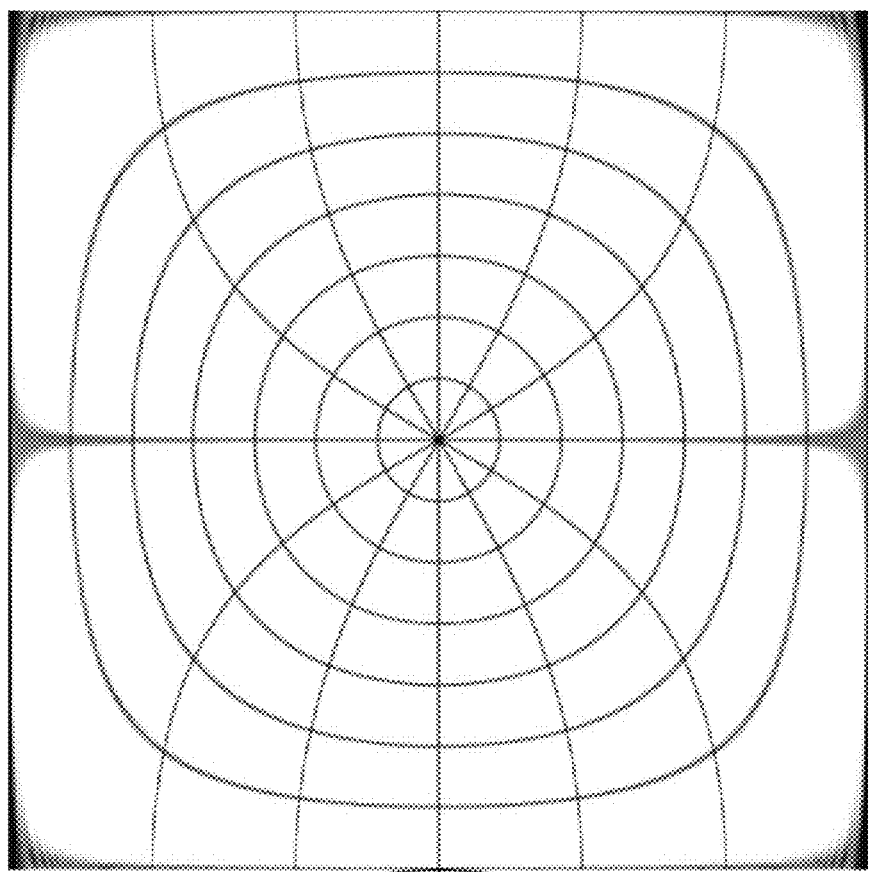
FIG. 1 illustrates an example of a gridded circle mapped to an equirectangular projection.
Figure 1:
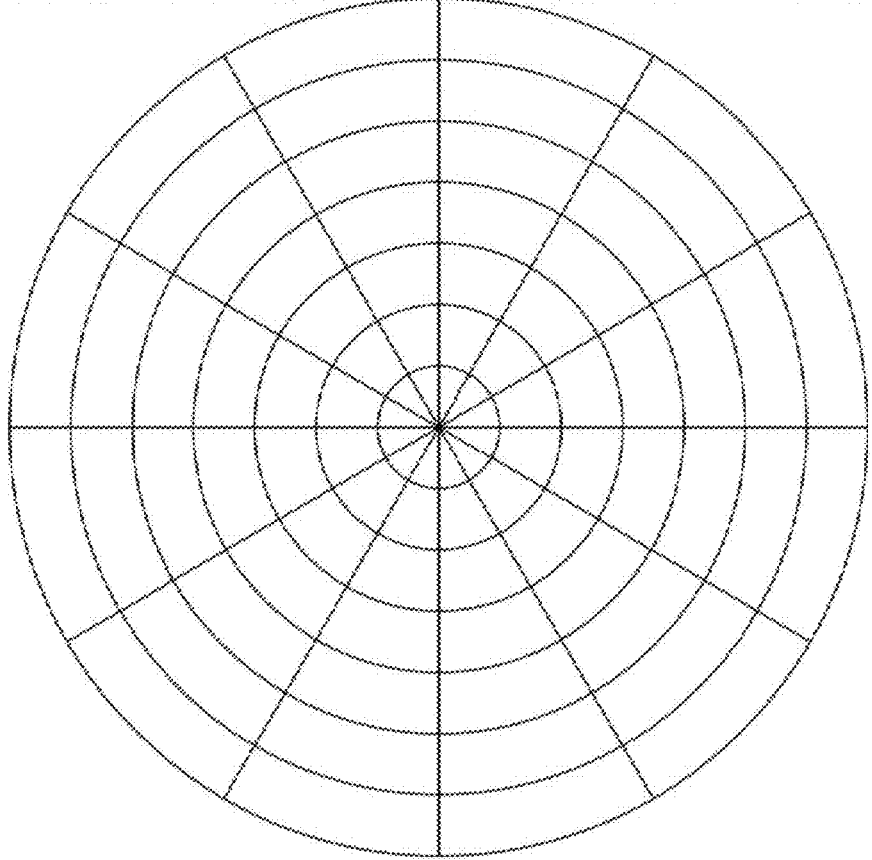

In order to capture a wide-angle view of a scene, fisheye camera lenses are typically used. These lenses deliver a highly-warped view that appears as a circular orb of visual data. If the scene is to be viewed properly, this fisheye view must be adjusted through a method of dewarping that renders the scene back into equirectangular proportions that are normally perceived by human eyes. The effect is that of stretching the circle into the corners of a circumscribed square. An example of a gridded circle mapped to an equirectangular projection is illustrated in FIG. 1.

When the parameters need to change (e.g., when the camera is changed to a fisheye with a different FOV) a new set of source coordinate coefficients (e.g., based on a different lens type and/or FOV) can be used. Processes in accordance with numerous embodiments of the invention can send the new set of source coordinate coefficients when sending the fragment shader to the GPU with WebGL, such that the core of the script does not change, only the parameters do. This can eliminate tens of millions of computationally intensive function calls on the GPU.

Figure 2:
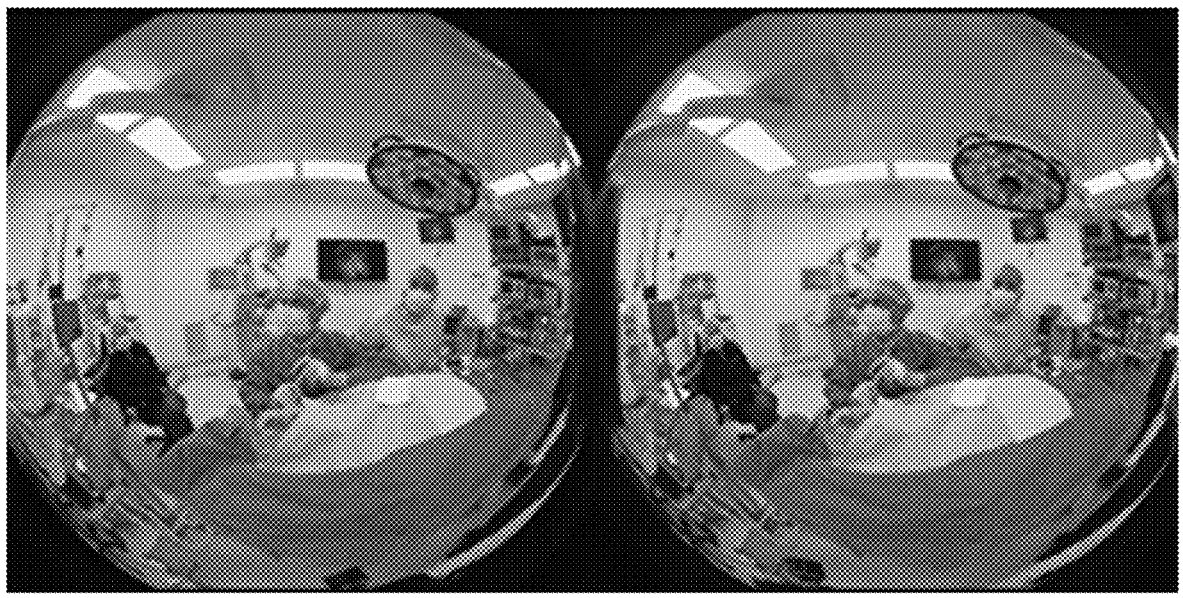
FIG. 2 illustrates an example of dual-fisheye to equirectangular mapping (or dewarping).
Figure 2:
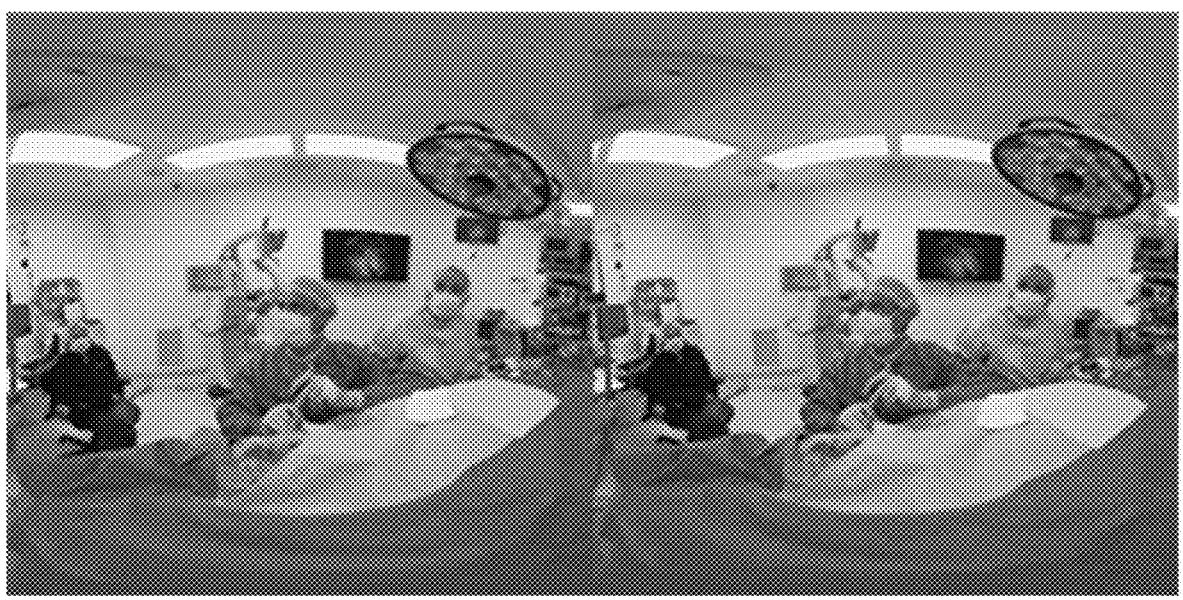

When a scene is to be rendered in a 3D headset, two or more fisheye lenses can be used in accordance with certain embodiments of the invention. In order to simulate the way that human eyes see the world, the scenes can be dewarped individually and delivered to a headset with one scene for each eye. An example of dual-fisheye to equirectangular mapping (or dewarping) is illustrated in FIG. 2.

In many embodiments, distortion correction is performed by generating source coordinates from a source image for each point in a target image. The source coordinates are the x- and y-coordinates in the fisheye images from which the pixel color information will be drawn. In a variety of embodiments, distortion correction can be performed using a set of one or more processors (e.g., graphical processing unit (GPU)), where the processors can assign the appropriate pixel color from the fisheye image to each of the destination pixels in the equirectangular image. In the case of video, once all the pixels in the target (or destination) image have been designated, the scene can be delivered as a completed frame.

Conventional methods of converting fisheye to rectangular coordinates often require converting several times and passing through intermediary coordinate systems (e.g., R3 and spherical) before projecting back down to R2 in order to approximate the physical properties of light. Such methods often rescale the coordinates before performing multiple coordinate system transformations to perform the mapping from the source to target images. A common method involves seven elementary trig functions, two arctangents, and a square root. Those functions are very computationally intensive and can tax a GPU to its limit. Systems and methods in accordance with some embodiments of the invention can provide a single-step method for remapping pixels from fisheye to equirectangular space in a way that avoids the computationally intensive steps of conventional methods of fisheye to equirectangular mapping. Processes in accordance with certain embodiments of the invention can result in faster performance and enable a wider range of low-powered devices to perform the mappings for distortion correction.

Processes for Distortion Correction

Figure 3:
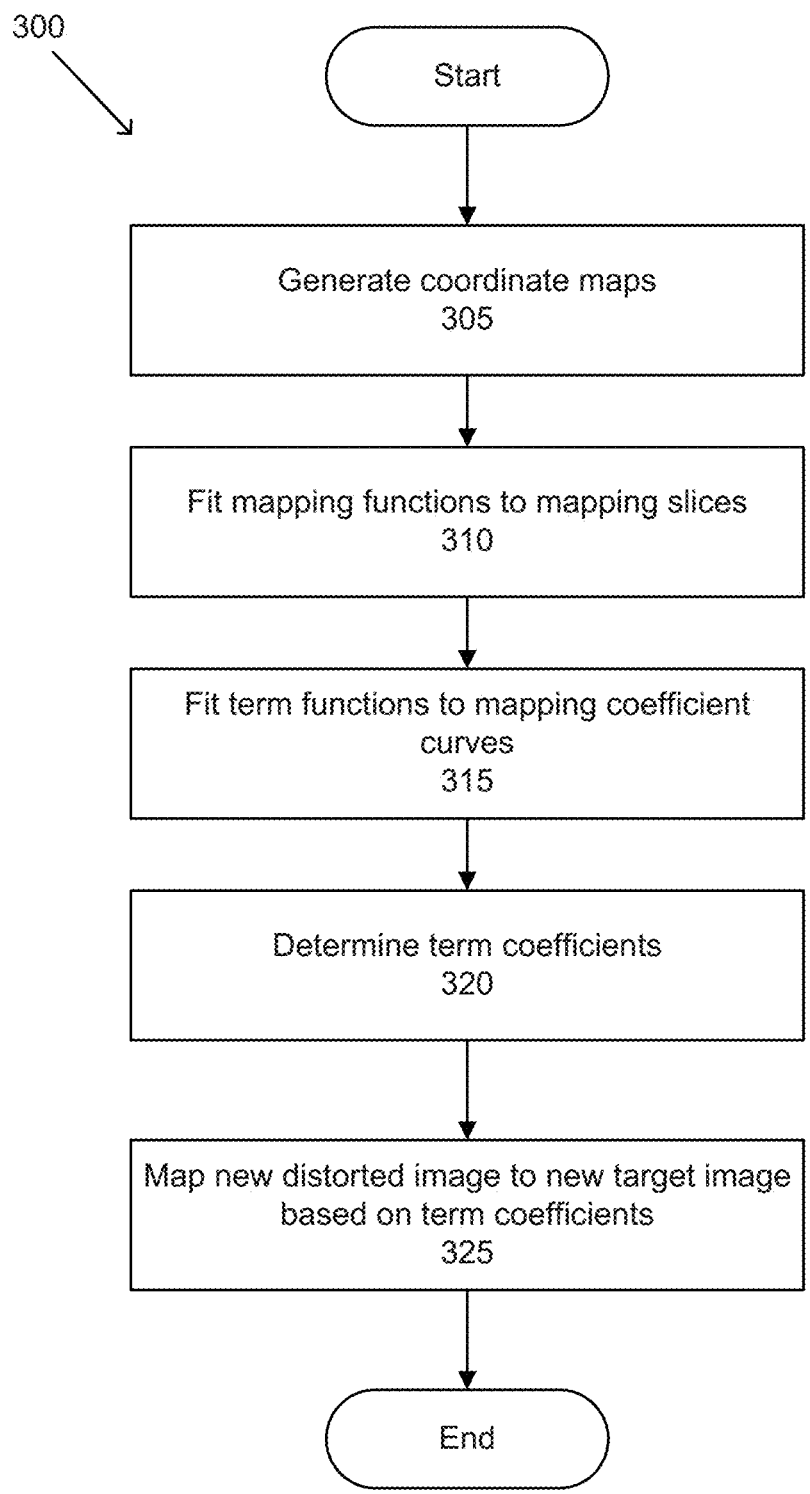
FIG. 3 conceptually illustrates an example of a process for correcting distortion in accordance with an embodiment of the invention.

An example of a process for correcting distortion in accordance with an embodiment of the invention is conceptually illustrated in FIG. 3. Process 300 generates (305) coordinate maps. In various embodiments, coordinate maps can be generated using theoretical models used in conventional dewarping methods. Coordinate maps in accordance with numerous embodiments of the invention can be mapped from distorted images using various mapping techniques, such as (but not limited to) Rational and Tangential Model (RT), Logarithmic Fisheye Model (FET), Polynomial Distortion Model (PFET), Division Model (Div), and/the Rational Function Model (RF). Each of these can be used as a theoretical model to generate the point mapping from fisheye to another perspective. Systems and methods in accordance with some embodiments of the invention can reproduce those mappings using far less computational power at runtime.

In some embodiments, coordinate maps can be generated by mapping source points in the fisheye (circular) region to destination points in the equirectangular (square) region using a theoretical model. Source images in accordance with some embodiments of the invention can include distorted images (e.g., wide-angle, fisheye, etc.), where the target image is a corrected (or dewarped) version of the image. Processes in accordance with a number of embodiments of the invention can perform the dewarping of the source image to the target image using conventional methods for distortion correction. Conventional methods based on the physics of light as it enters a lens may be more processing and/or memory intensive, but may be quite accurate. By mapping the source image to an accurate target image, processes in accordance with certain embodiments of the invention can generate corrected images by approximating accurate distortion corrections without using more burdensome conventional methods.

Figure 4:
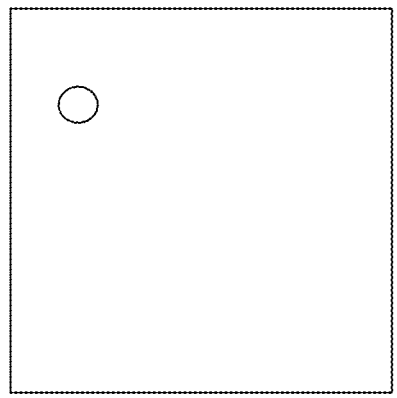
FIG. 4 illustrates an example of coordinate maps in accordance with an embodiment of the invention.
Figure 4:
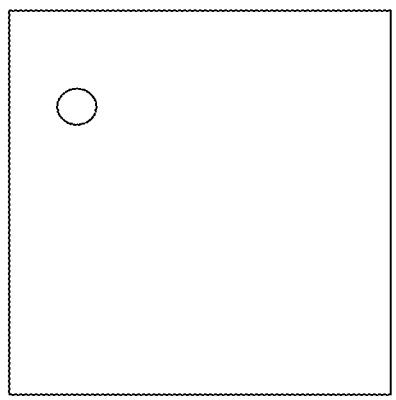
Figure 4:
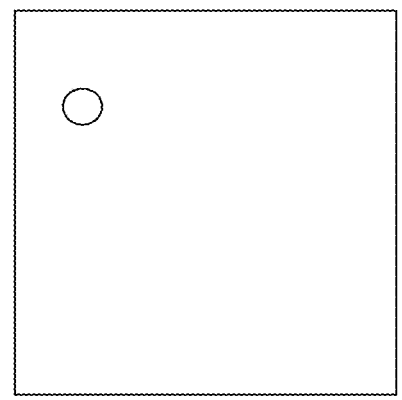
Figure 4:
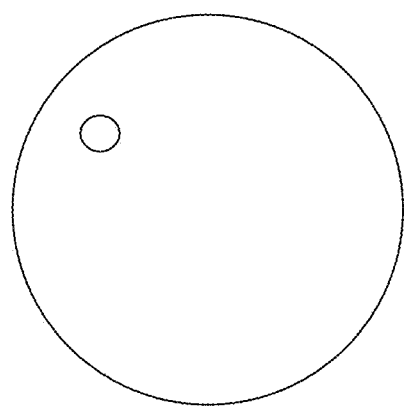

Mapping in accordance with some embodiments of the invention can be represented as a pair of coordinate maps with dimensions matching the target image. An example of coordinate maps in accordance with an embodiment of the invention is illustrated in FIG. 4. The example of this figure illustrates a target image 405, coordinate maps 410 and 415, and a source image 420. Source image 420 in this example is a fisheye image. The circle in the target image 405 gets its value from the corresponding area of source image 420.

X-coordinate maps (or x-maps) in accordance with a number of embodiments of the invention can store the x-coordinates of a corresponding source image for each location of a target image. Y-coordinate maps (or y-maps) in accordance with a number of embodiments of the invention can store the y-coordinates of a corresponding source image for each location of a target image. In this example, the circle of x-map 410 corresponds to the same location in target image 405 and stores the x-coordinate of the circle in source image 420. Similarly, the circle of y-map 415 corresponds to the same location in target image 405 and stores the y-coordinate of the circle in source image 420. For example, if the value for a particular location ($x_{target}$, $y_{target}$) of the target image is drawn from a location ($x_{source}$, $y_{source}$) from the source image, then the x-map at ($x_{target}$, $y_{target}$) will equal $x_{source}$, while the y-map at ($x_{target}$, $y_{target}$) will equal $y_{source}$.

Figure 5:
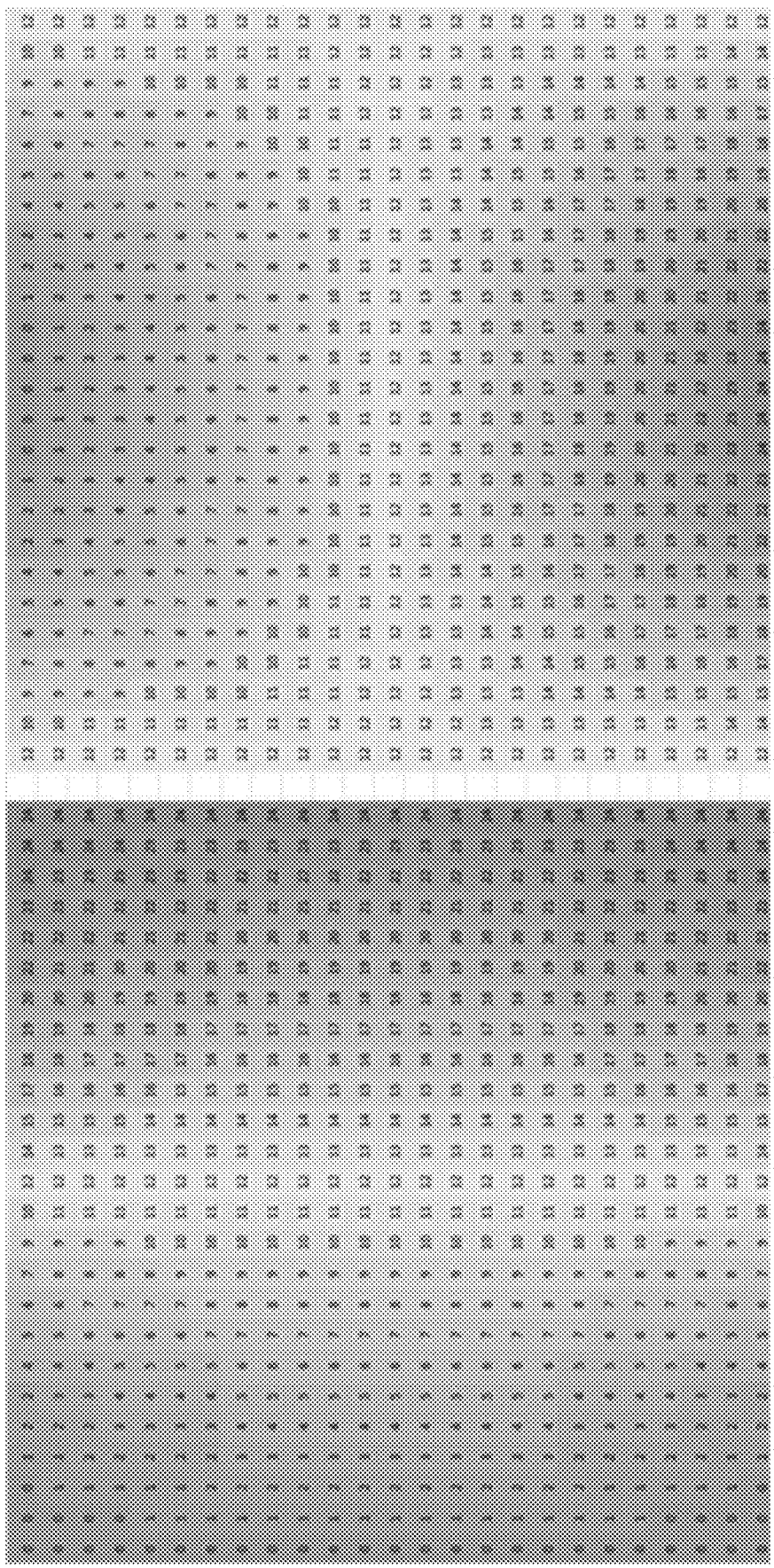
FIG. 5 illustrates example heatmaps representing the mappings of a source image to a target image in accordance with an embodiment of the invention.

The final x- and y-mappings can be represented as a pair of surfaces that describe where the pixels have been drawn from. In some embodiments, the mappings can be represented as heatmaps. Example heatmaps representing the mappings of a source image to a target image in accordance with an embodiment of the invention are illustrated in FIG. 5. In this example, heatmap 505 represents the x-map for a 25×25 pixel target image. The value (and color) at each location is the x-coordinate of the source image to which the corresponding location in the target image is mapped. Similarly, heatmap 510 represents the corresponding y-map for the target image where the value (and color) at each location is the corresponding y-coordinate of the source image.

Process 300 fits (310) mapping functions to mapping slices. Mapping slices in accordance with various embodiments of the invention are slices of a coordinate map along a dimension of the map. In numerous embodiments, mapping slices are taken for each fixed y-value of the x-map and/or y-map. Alternatively, or conjunctively, mapping slices can be taken along the x-axis, with slices of y-values along each fixed x-value.

Figure 6:
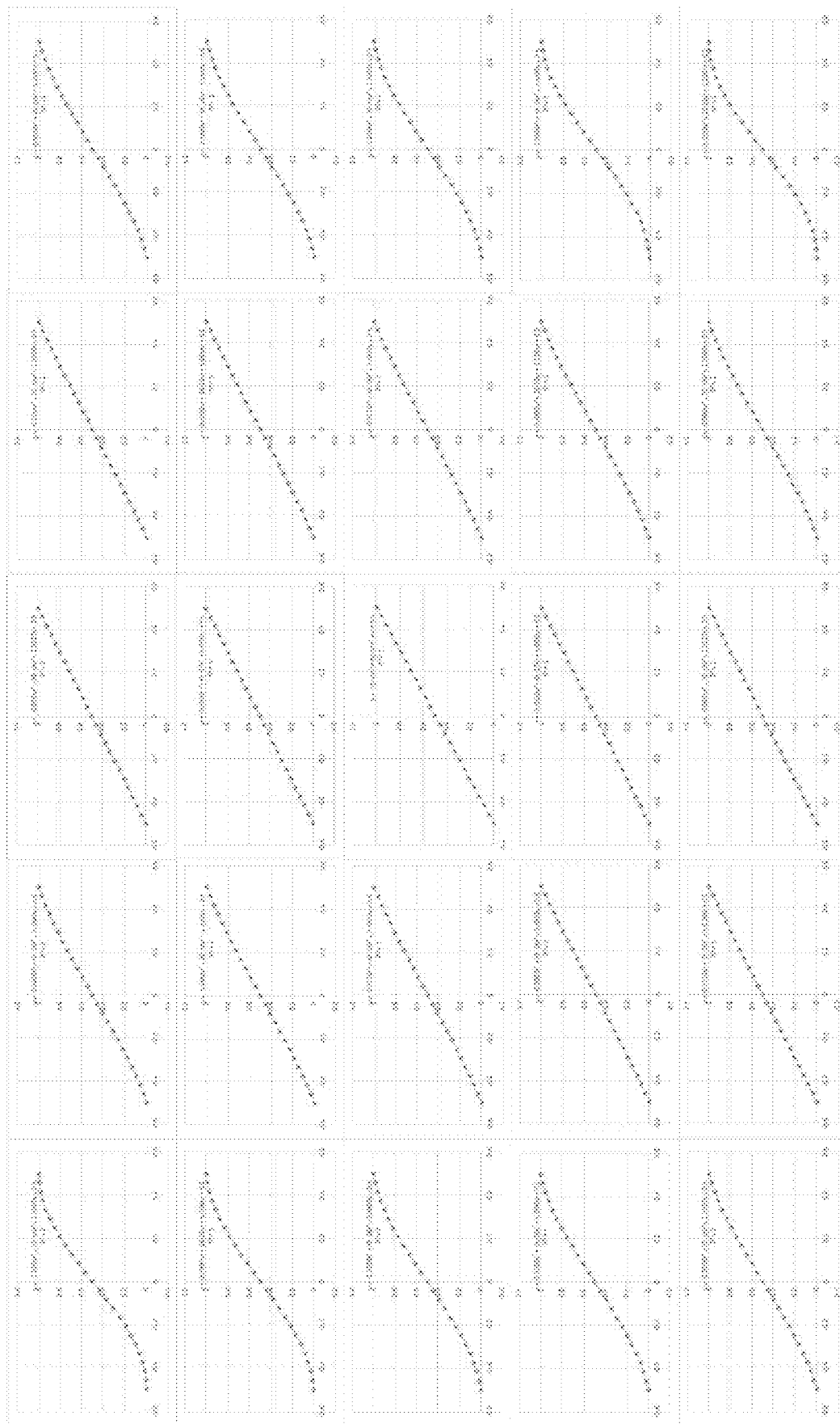
FIG. 6 illustrates examples of mapping functions fit to x-mapping slices (slices of an x-map) in accordance with an embodiment of the invention.
Figure 7:
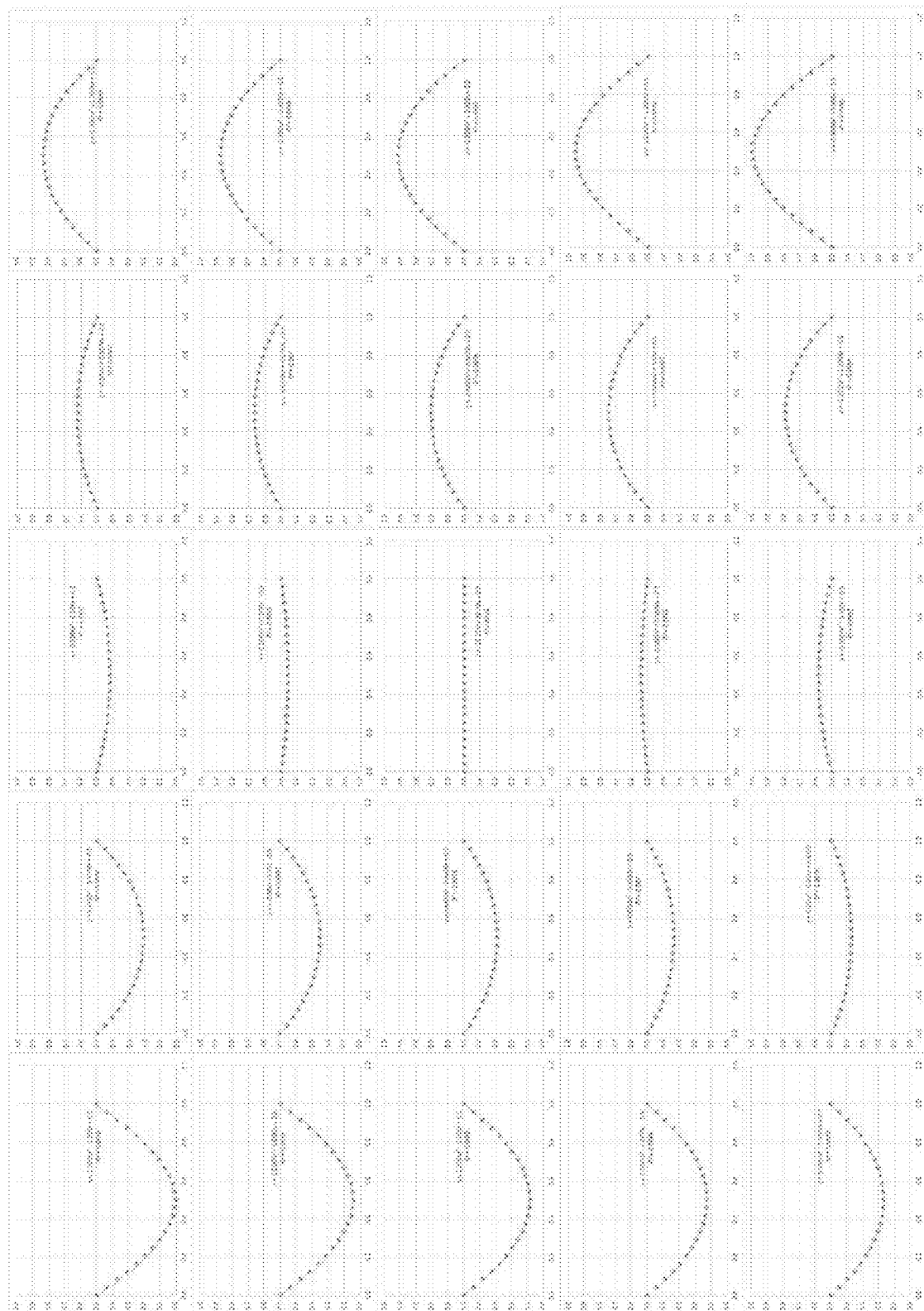
FIG. 7 illustrates examples of mapping functions fit to y-mapping slices (slices of a y-map) in accordance with an embodiment of the invention.

Examples of mapping functions fit to x-mapping slices (slices of an x-map) and y-mapping slices (slices of an y-map) are illustrated in FIGS. 6 and 7 respectively. Each chart in FIG. 6 represents a curve that is fit to the mapping slice for different y-values in the example x-map of FIG. 4. Each chart also includes a mapping function (or polynomial) that has been fit to the mapping slice. Similarly, each chart in FIG. 7 represents a curve that is fit to the mapping slice for different y-values in the example y-map of FIG. 4. Although many of the examples described herein taking mapping slices along the y-axis, one skilled in the art will recognize that mapping slices could be taken along another axis (e.g., the x-axis), without departing from this invention.

In a variety of embodiments, mapping functions can be fit for each mapping slice, where each mapping function is a polynomial with parameters to most closely fit each mapping slice. In this example, it can be seen that the x-mapping slices appear to follow a parabolic curve, so mapping functions for the x-mapping slices can be quadratic equations (e.g., of the form $Ax^2+Bx+0.5$). The y-mappings of this example appear to follow a cubic curve, so mapping functions for the mapping slices can be cubic equations (e.g., of the form $Cx^3+Dx+0.5$).

For larger images, there can be higher order perturbations that are not accounted for by the assumptions that the profiles can be represented by simple parabolic and cubic curves. By increasing the degree of the polynomials from the profiles, greater accuracy can be achieved. In a number of embodiments, mapping functions are higher order even polynomials (e.g., quartic polynomials, etc.) or higher order odd polynomials (e.g., quantic polynomials, etc.), depending on whether the coefficient profiles are symmetric or anti-symmetric. In some embodiments, mapping functions for one of the coordinate maps are even polynomials, while mapping functions for the other coordinate map are odd polynomials.

Process 300 fits (315) term functions to mapping coefficient curves. Mapping coefficient curves in accordance with certain embodiments of the invention are curves that represent changes in the coefficients of each term of the fitted mapping functions. In a variety of embodiments, a separate term function is fitted for each term of the fitted mapping functions for each coordinate map. For example, in a cubic mapping function, a separate term function can be fitted for the $x^3$ term, the $x^2$ term, the x term, and/or the constant term.

Figure 8:
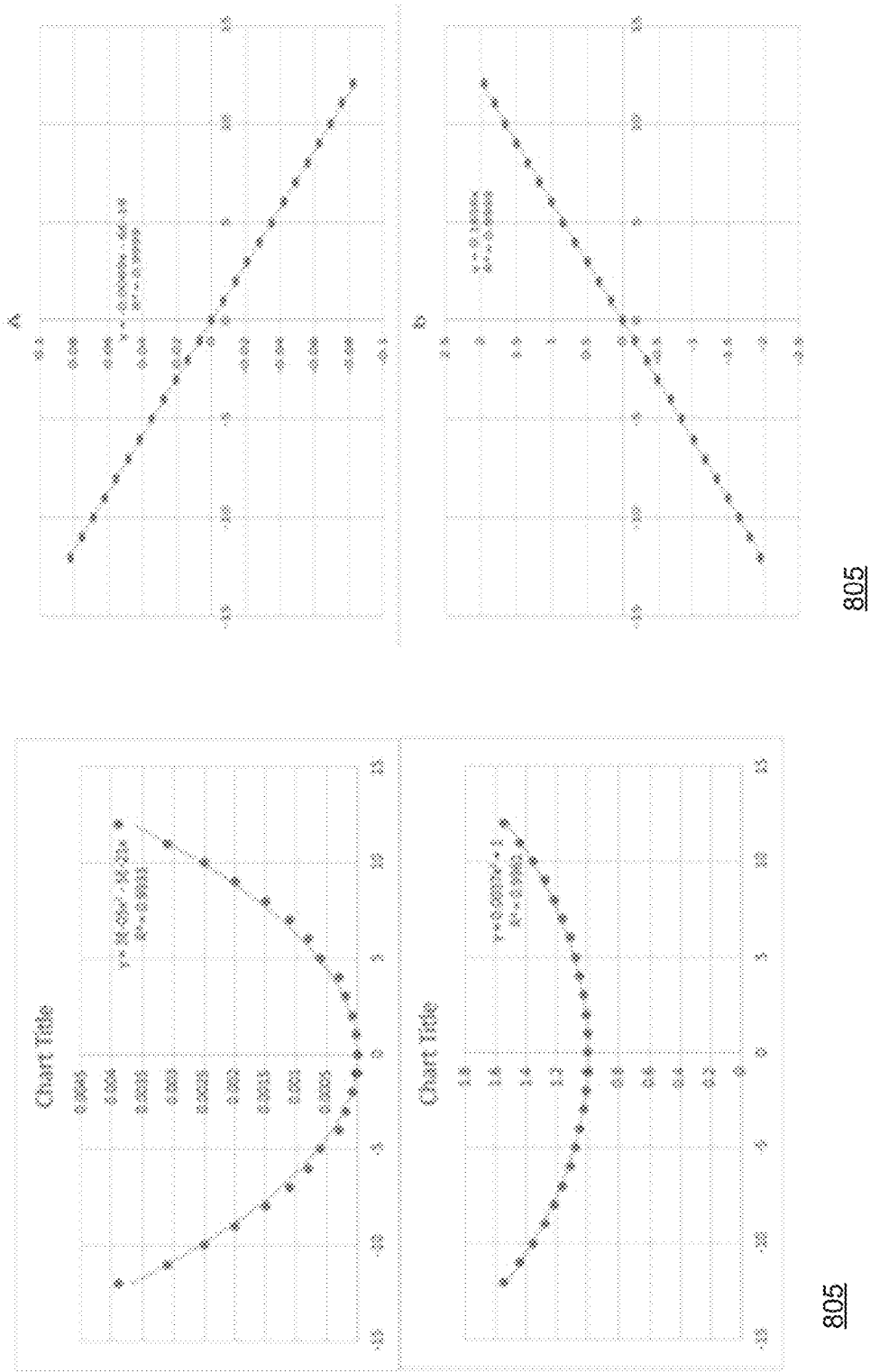
FIG. 8 illustrates examples of mapping coefficient curves in accordance with an embodiment of the invention.

Fitted term functions can track the changes in the coefficients (e.g., across the y-values in the examples above). Examples of mapping coefficient curves in accordance with an embodiment of the invention are illustrated in FIG. 8. The graphed mapping coefficient curves 805 represent the changes in the coefficients of each term of the fitted mapping functions for the x-map, while the graphed mapping coefficient curves 805 represent the changes in the coefficients of each term of the fitted mapping functions for the y-map. As can be seen in this example, the curves 805 for the x-map appear to follow a parabolic curve, where the curves 810 for the y-map are more linear.

Figure 9:
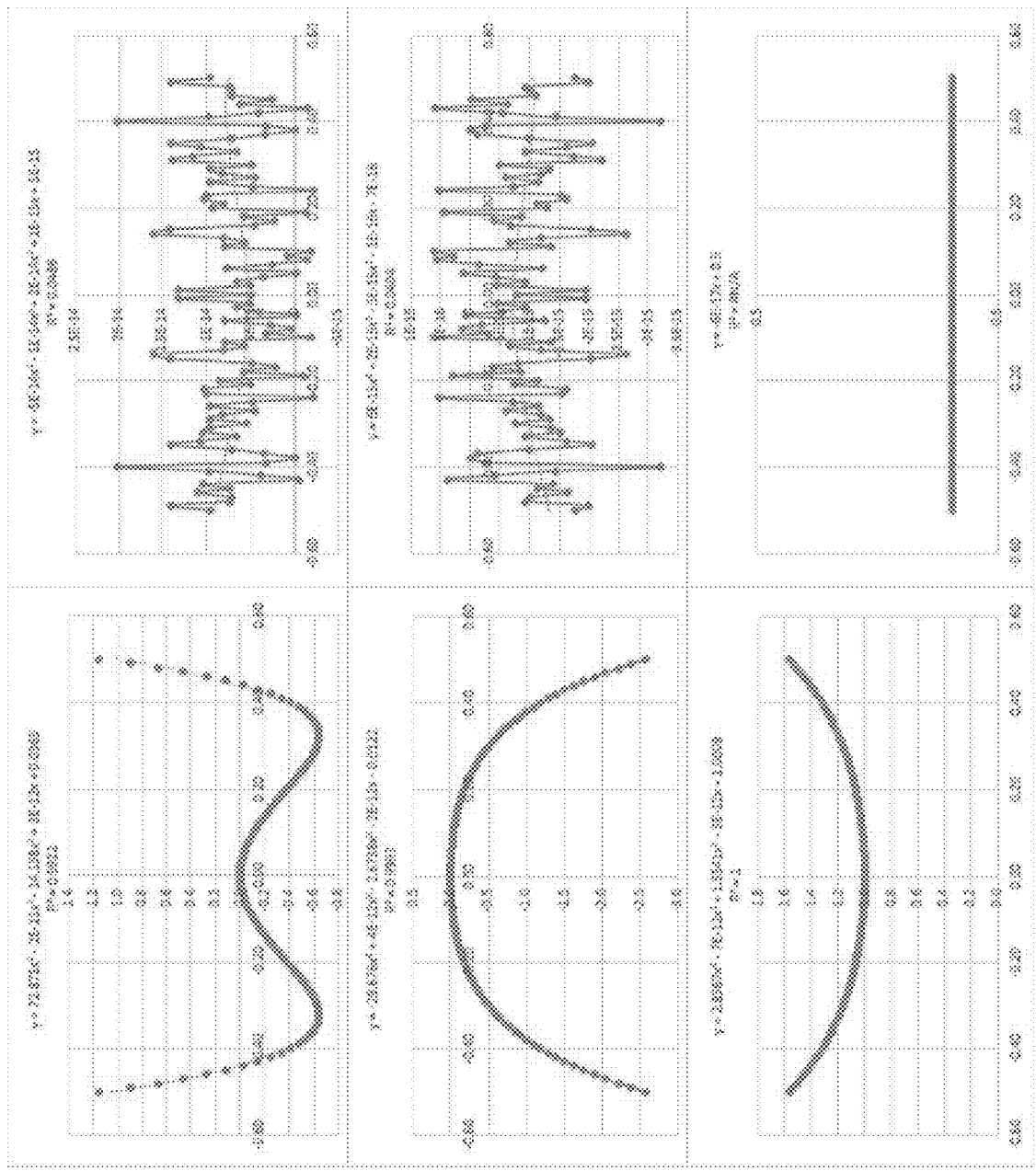
FIG. 9 illustrates examples of fitted term functions for the x-map in accordance with an embodiment of the invention.
Figure 10:
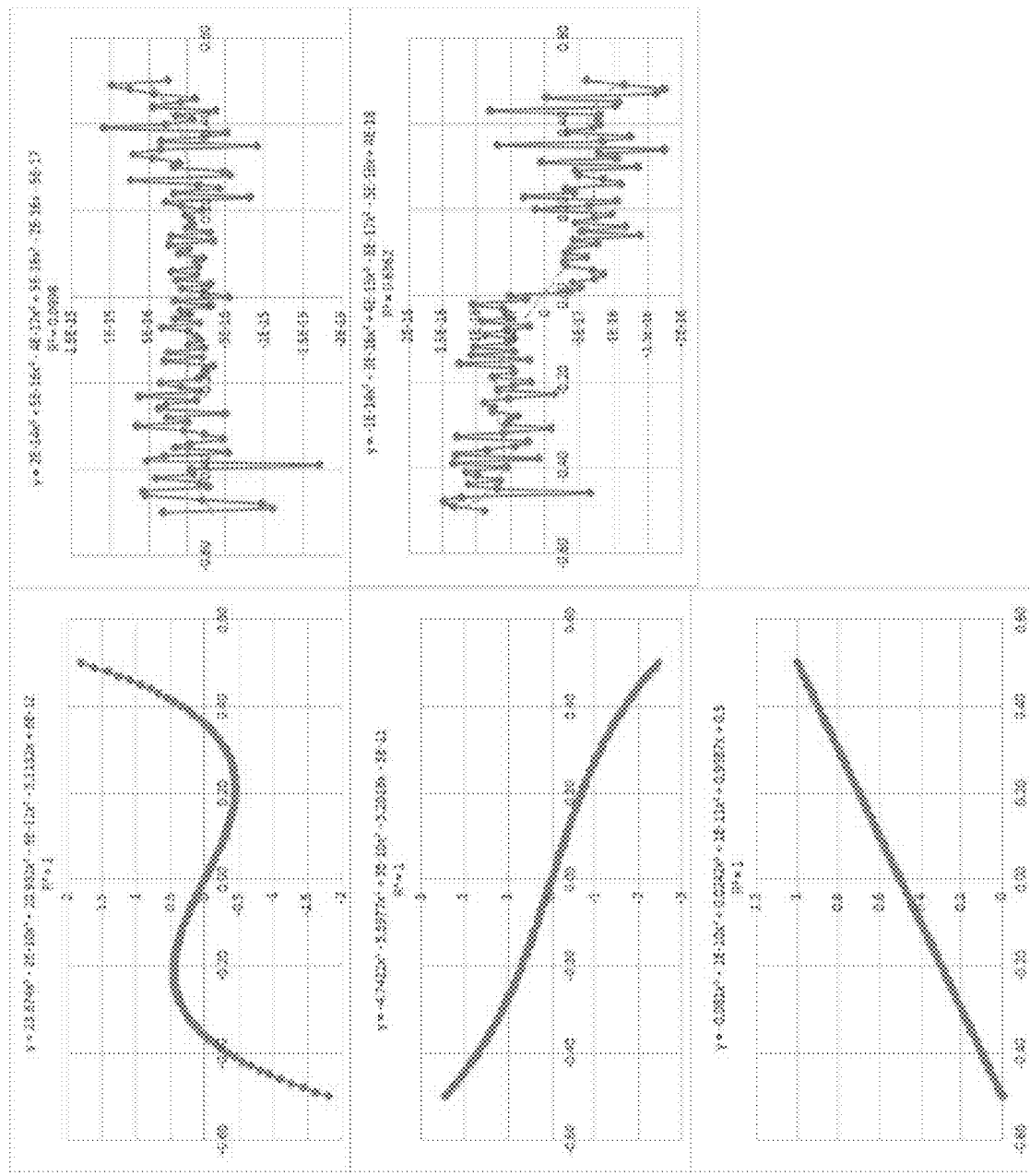
FIG. 10 illustrates examples of fitted term functions for the y-map in accordance with an embodiment of the invention.

For higher-order mapping functions, the fitted term functions may take other profiles. In some embodiments, changes in these coefficients (across the y-values) can then be approximated with term functions, which can be polynomial functions. Examples of fitted term functions for the x-map and the y-map are illustrated in FIGS. 9 and 10 respectively. Since mapping coefficient curves generated have an apparent symmetry (or anti-symmetry), in some embodiments, mapping coefficient curves can be shifted to center around the origin so that several of the term coefficients will drop out of the expansion.

Process 300 determines (320) term coefficients based on the fitted term functions. Examples of term coefficients for quartic and quantic polynomials fitted to a 180 degree fisheye to a 180 degree FOV are illustrated in the first table 1105 of FIG. 11. In this example, the term functions are quartic polynomials for the mapping functions of the x-map and quantic polynomials for the mapping functions of the y-map. In this example, a total of 60 coefficients are used for the accurate approximation of the mapping surfaces.

Figure 11:
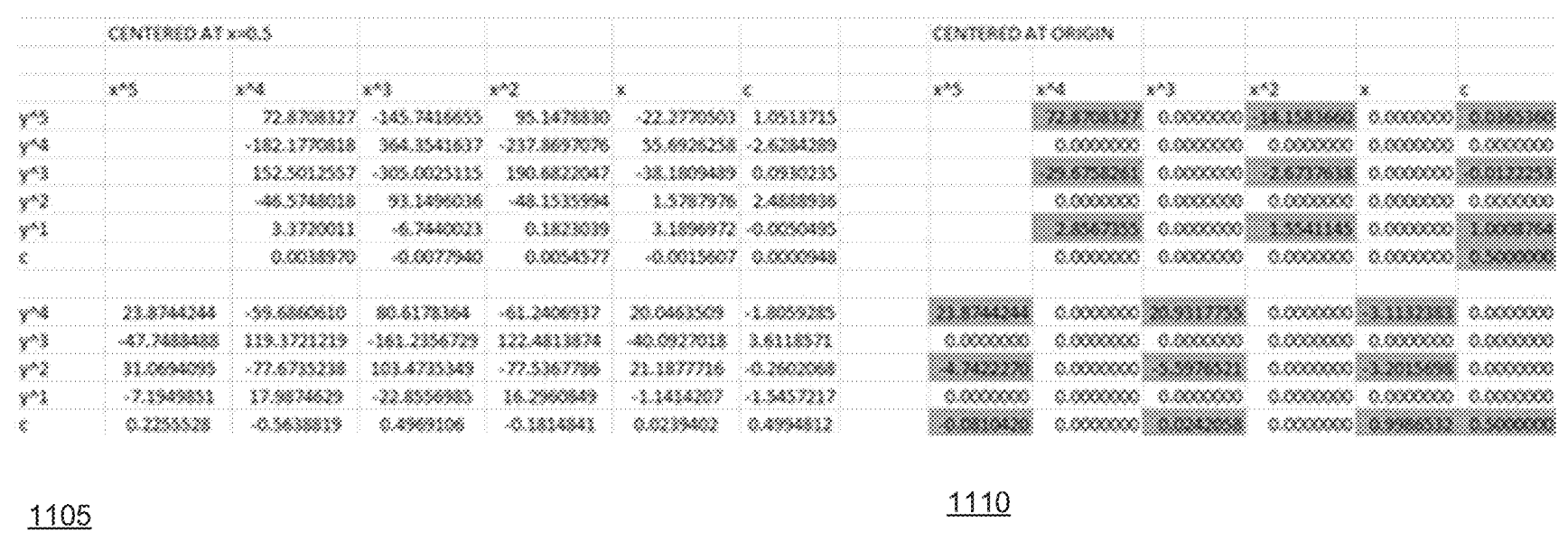

In several embodiments, mapping coefficient curves can be shifted to center around the origin. As seen in the examples of FIGS. 9 and 10, when mapping coefficient curves are shifted in accordance with several embodiments of the invention, several of the term coefficients can be dropped out of the expansion. The second table 1105 of FIG. 11 shows that by shifting the mapping coefficient curves to be centered at the origin, many of the terms drop to zero, leaving only 18 term coefficients that need to be used to accurately approximate the same mapping surfaces. In doing so, the 60 parameters that were needed before reduces to just 18. This is a powerful simplification that systems and methods in accordance with various embodiments of the invention can capitalize on in order to perform the mappings with greater efficiency than other conventional methods, while still maintaining a high level of convergence.

In the examples described above, the 18 coefficients for mapping a 180 degree fisheye to a 180 degree FOV are:

a11, a12, a13=72.8708327320716, −14.1583660491294, 0.0365360106659;
a21, a22, a23=−29.675826088964, −2.6737638254516, −0.0122252919828;
a31, a32, a33=2.8567354676492, 1.5541144717343, 1.0008763707917;
b11, b12, b13=23.8744243869245, 20.9317754611518, −3.113238321583;
b21, b22, b23=−4.7422270473676, −5.5976520892558, −3.2015697676648;
b31, b32, b33=−0.0810419980574, 0.0242057893383, 0.9986532315234;

In some embodiments, processes can determine generalized term coefficients that can be used for lenses other than the one used to create the original corrections. Lenses of a given distortion type (e.g., rectilinear, stereographic, equidistant, equisolid, orthographic, etc.) can produce coefficients that are correlated with the field of view (FOV) of the lens. Generalized term coefficients in accordance with several embodiments of the invention can be used for any FOV lens, as long as it is of the same type as original the lens used to compute the term coefficients. In various embodiments, generalized term coefficients can be computed by multiplying the term coefficients by the FOV of the original lens.

Term coefficients in accordance with several embodiments of the invention can then be used to map new distorted images to new target images by computing coefficients for the source coordinate function based on the x- and/or y-values of the target coordinate set. In certain embodiments, generalized term coefficients can be provided to a client device that can adjust the source coordinate function based on the FOV of a lens associated with the distorted images to be corrected.

Process 300 maps (325) new distorted image to new target image based on term coefficients. The source coordinate function with the computed coefficients can then be used to compute the source coordinate based on the x- and/or y-values of the target coordinate set. Term coefficients in accordance with a variety of embodiments of the invention can be sufficient to closely approximate conventional methods for distortion correction. In some embodiments, term coefficients for a given lens can be provided to a distortion correction application to distort corrections for images captured with the lens. In numerous embodiments, generalized term coefficients can be used (e.g., by dividing by the FOV) to get specific term coefficients for a given lens used to capture new distorted images.

In numerous embodiments, term coefficients can be used as parameters for source coordinate functions for determining the source coordinates for each location in a target image. Source coordinate functions in accordance with several embodiments of the invention can take a target coordinate set (e.g., x and y values for a location in the target image) and compute a corresponding source coordinate set (e.g., x and y values for a location in the source image). In various embodiments, source coordinate functions can be written as a function of both x- and y-coordinates and can very closely approximate the mapping surfaces described above. Source coordinate functions in accordance with a number of embodiments of the invention can include an x-coordinate function and a y-coordinate function for computing each coordinate of the source coordinate set. In a variety of embodiments, source coordinate functions can be polynomials of various powers, including (but not limited to) quadratic polynomials, cubic polynomials, quartic polynomials, quintic polynomials, sextic polynomials, and/or septic polynomials. Examples of source coordinate sets of the non-zero terms for different degree polynomials are illustrated in FIG. 12. These can be written as follows, where $A_{mn}$ and $B_{mn}$ are matrices of the term described above.

$$X(x, y) = \sum_{n=0}^{N-1}\left[\sum_{m=0}^{N} \frac{A_{mn}}{FOV}\left(x - \frac{1}{2}\right)^m\right]\left(y - \frac{1}{2}\right)^n$$

$$Y(x, y) = \sum_{n=0}^{N}\left[\sum_{m=0}^{N-1} \frac{B_{mn}}{FOV}\left(x - \frac{1}{2}\right)^m\right]\left(y - \frac{1}{2}\right)^n$$

While specific processes for correcting distorted images are described above, any of a variety of processes can be utilized to correct distorted images as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 13:
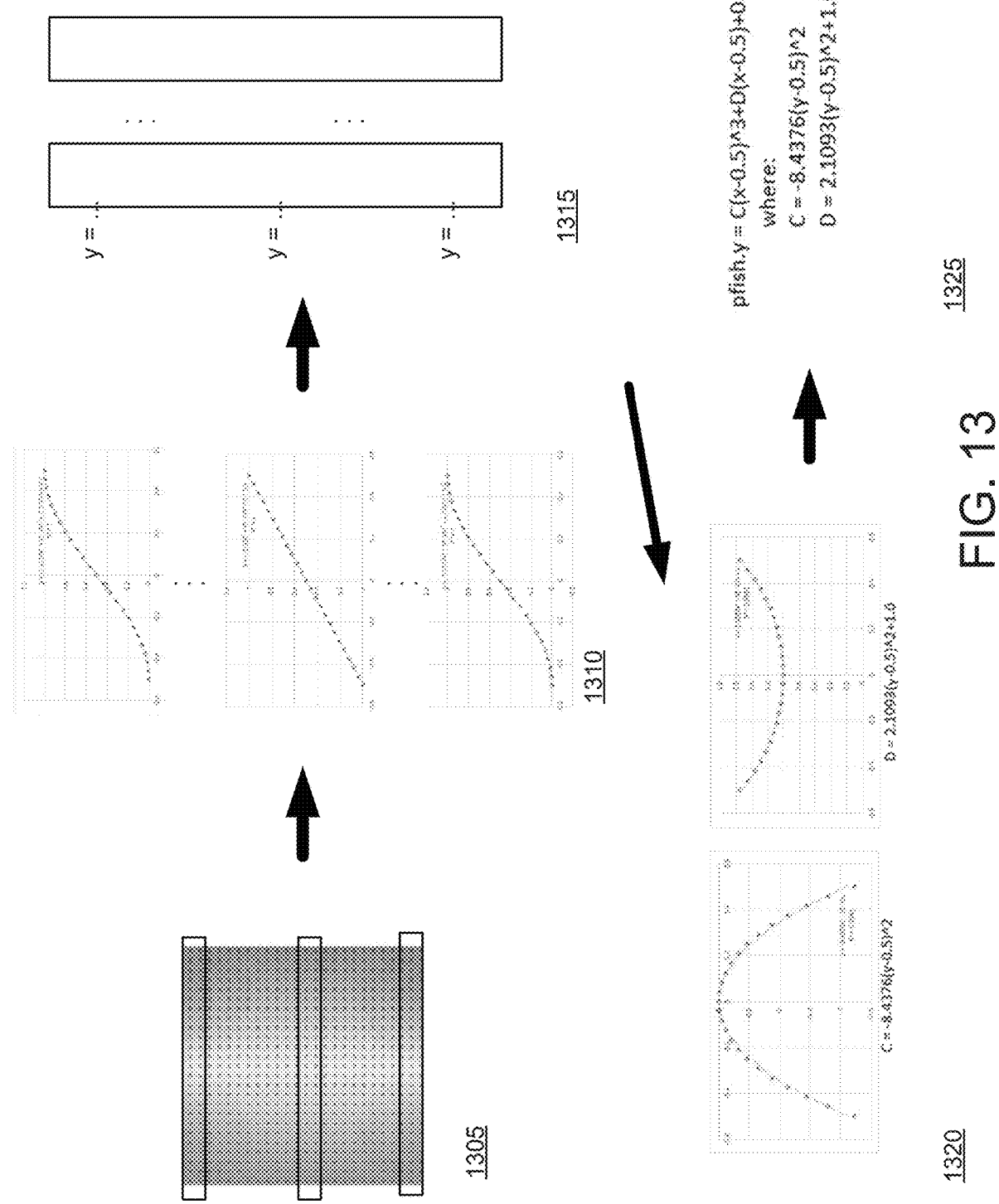
FIG. 13 illustrates a summary flowchart of a process for correcting distortion in accordance with an embodiment of the invention.

A summary flowchart of a process for correcting distortion in accordance with an embodiment of the invention is illustrated in FIG. 13. This example shows an example of how term coefficients for a source coordinate equation for y-coordinates can be computed. The first stage 1305 shows that y-mappings are computed from a theoretical model. In the second stage 1310, each row is plotted and a least-squares curve is fit to the data. In the third stage 1315, the coefficients of each of the polynomials are extracted and plotted. The fourth stage 1320 shows that a least-squares curve is fit to the coefficients. Stage 1325 shows that the pfish.y formula is compiled based on the coefficients of the least-squares curves of stage 1320.

Systems for Distortion Correction
Distortion Correction System

Figure 14:
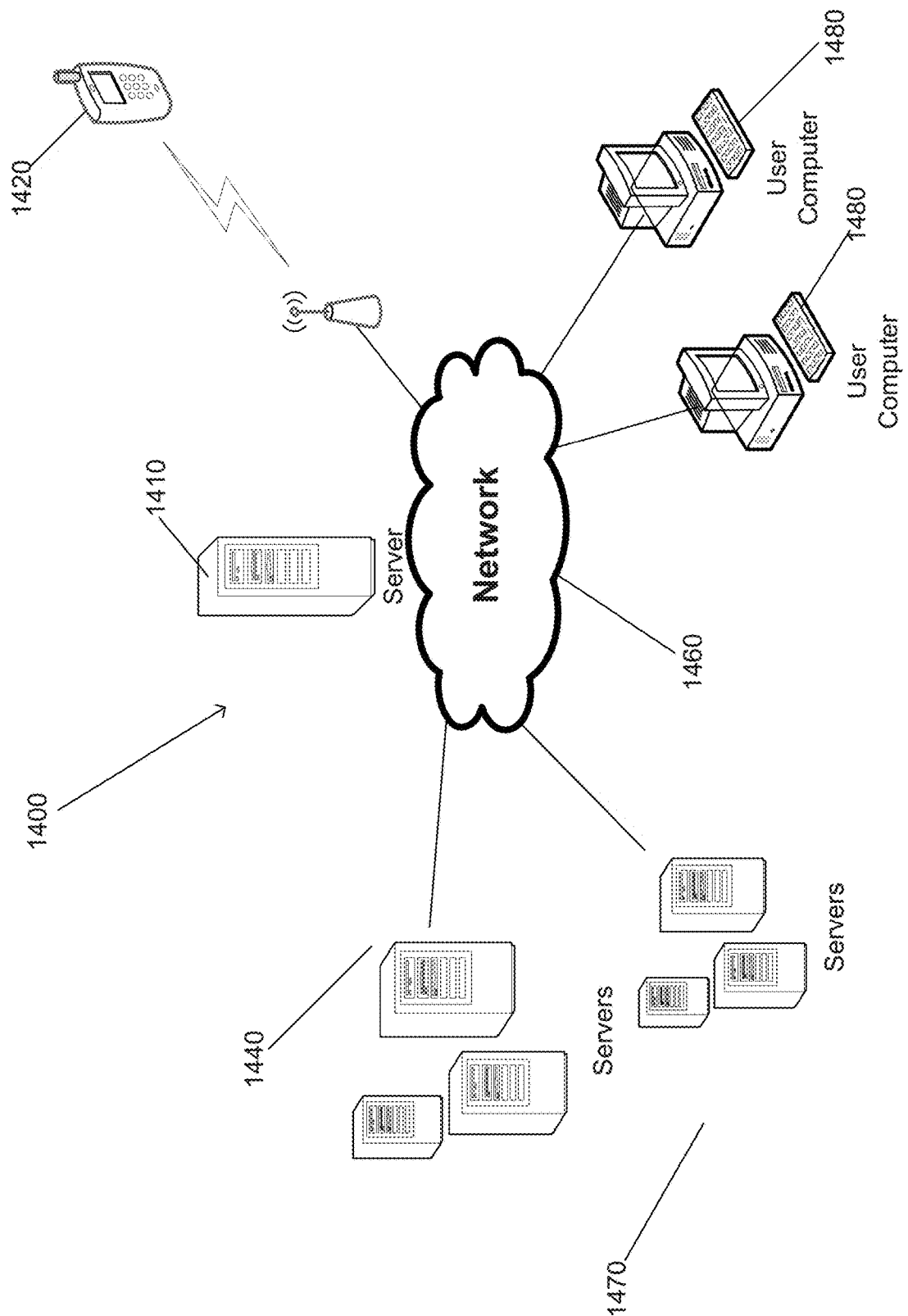
FIG. 14 illustrates an example of a distortion correction system that corrects distorted images in accordance with an embodiment of the invention.

An example of a distortion correction system that corrects distorted images in accordance with some embodiments of the invention is shown in FIG. 14. Network 1400 includes a communications network 1460. The communications network 1460 is a network such as the Internet that allows devices connected to the network 1460 to communicate with other connected devices. Server systems 1410, 1440, and 1470 are connected to the network 1460. Each of the server systems 1410, 1440, and 1470 is a group of one or more servers communicatively connected to one another via internal networks that execute processes that provide cloud services to users over the network 1460. For purposes of this discussion, cloud services are one or more applications that are executed by one or more server systems to provide data and/or executable applications to devices over a network. The server systems 1410, 1440, and 1470 are shown each having three servers in the internal network. However, the server systems 1410, 1440 and 1470 may include any number of servers and any additional number of server systems may be connected to the network 1460 to provide cloud services. In accordance with various embodiments of this invention, a distortion correction system that uses systems and methods that can correct distorted images in accordance with an embodiment of the invention may be provided by a process being executed on a single server system and/or a group of server systems communicating over network 1460. In many embodiments, term coefficients can be determined at a single time (e.g., at a server) and distributed to other devices (e.g., client devices) that can use the term coefficients to map and/or correct distorted images to target images.

Users may use personal devices 1480 and 1420 that connect to the network 1460 to perform processes that can correct distorted images in accordance with various embodiments of the invention. In the shown embodiment, the personal devices 1480 are shown as desktop computers that are connected via a conventional "wired" connection to the network 1460. However, the personal device 1480 may be a desktop computer, a laptop computer, a smart television, an entertainment gaming console, or any other device that connects to the network 1460 via a "wired" connection. The mobile device 1420 connects to network 1460 using a wireless connection. A wireless connection is a connection that uses Radio Frequency (RF) signals, Infrared signals, or any other form of wireless signaling to connect to the network 1460. In FIG. 14, the mobile device 1420 is a mobile telephone. However, mobile device 1420 may be a mobile phone, Personal Digital Assistant (PDA), a tablet, a smartphone, or any other type of device that connects to network 1460 via wireless connection without departing from this invention.

As can readily be appreciated the specific computing system used to correct distorted images is largely dependent upon the requirements of a given application and should not be considered as limited to any specific computing system(s) implementation.

Distortion Correction Element

Figure 15:
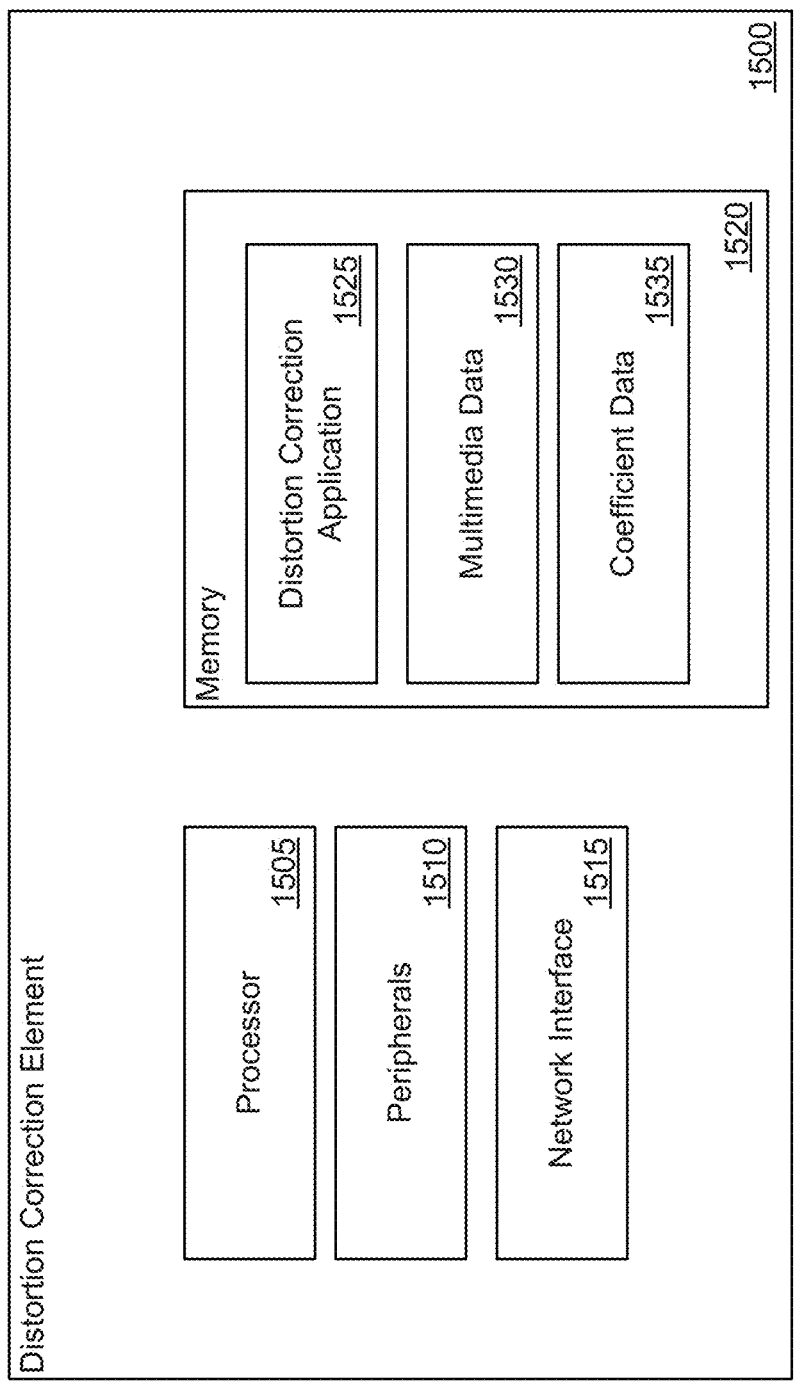
FIG. 15 illustrates an example of a distortion correction element that corrects distorted images in accordance with an embodiment of the invention.

An example of a distortion correction element that executes instructions to perform processes that can correct distorted images in accordance with various embodiments of the invention is shown in FIG. 15. Distortion correction elements in accordance with many embodiments of the invention can include (but are not limited to) one or more of mobile devices, cameras, and/or computers. Distortion correction element 1500 includes processor 1505, peripherals 1510, network interface 1515, and memory 1520. One skilled in the art will recognize that a distortion correction element may exclude certain components and/or include other components that are omitted for brevity without departing from this invention.

One skilled in the art will recognize that a distortion correction element may include other components that are omitted for brevity without departing from this invention. The processor 1505 can include (but is not limited to) a processor, microprocessor, controller, or a combination of processors, microprocessor, and/or controllers that performs instructions stored in the memory 1520 to manipulate data stored in the memory. Processor instructions can configure the processor 1505 to perform processes in accordance with certain embodiments of the invention.

Peripherals 1510 can include any of a variety of components for capturing data, such as (but not limited to) cameras, displays, and/or sensors. In a variety of embodiments, peripherals can be used to gather inputs and/or provide outputs. Distortion correction element 1500 can utilize network interface 1515 to transmit and receive data over a network based upon the instructions performed by processor 1505. Peripherals and/or network interfaces in accordance with many embodiments of the invention can be used to gather inputs (e.g., distorted images, term coefficients, etc.) that can be used to correct distorted images.

Memory 1520 includes a distortion correction application 1525, multimedia data 1530, and coefficient data 1535. Distortion correction applications in accordance with several embodiments of the invention can be used to correct distorted images. Multimedia data in accordance with a variety of embodiments of the invention can include various types of multimedia data that can be used in distortion correction processes. In certain embodiments, multimedia data can include (but is not limited to) video, images, etc. Multimedia data in accordance with many embodiments of the invention can include distorted images with corresponding target images that can be used for determining term coefficients. In many embodiments, multimedia data can include distorted images that need to be mapped and/or dewarped to target images.

In several embodiments, coefficient data can store term coefficients that can be used to compute mappings from a source image to a target image as described throughout this description. Coefficient data in accordance with a variety of embodiments of the invention can be determined directly by a distortion correction element or received over a network.

Although a specific example of a distortion correction element 1500 is illustrated in FIG. 15, any of a variety of distortion correction elements can be utilized to perform processes for correcting distorted images similar to those described herein as appropriate to the requirements of specific applications in accordance with embodiments of the invention.

Distortion Correction Application

Figure 16:
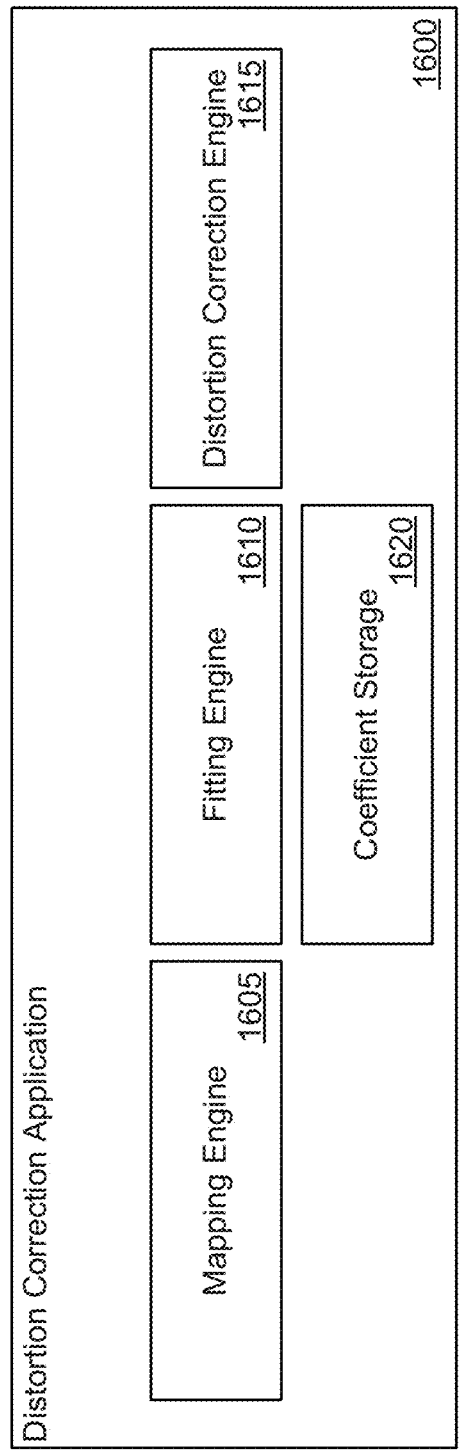
FIG. 16 illustrates an example of a distortion correction application that corrects distorted images in accordance with an embodiment of the invention.

An example of a distortion correction application for correcting distorted images in accordance with an embodiment of the invention is illustrated in FIG. 16. Distortion correction application 1600 includes mapping engine 1605, fitting engine 1610, distortion correction engine 1615, and coefficient storage 1620. One skilled in the art will recognize that a distortion correction application may exclude certain components and/or include other components that are omitted for brevity without departing from this invention.

Mapping engines in accordance with some embodiments of the invention can map points from a source image to a target image. In some embodiments, mapping engines can generate coordinate maps that reflect a coordinate value (e.g., x- or y-coordinates) from a source image for each location of a target image. In some embodiments, source images can include distorted images (e.g., wide-angle, fisheye, etc.), where the target image is a corrected (or dewarped) version of the image.

In a number of embodiments, fitting engines can fit functions to points in space, where the points can include (but are not limited to) mapping slices, mapping function coefficients, etc. In many embodiments, fitting engines can fit mapping functions to mapping slices of coordinate maps, where the mapping functions can approximate the curve of coordinate mappings across an axis. Fitting engines in accordance with numerous embodiments of the invention can fit term functions to mapping coefficient curves, where the term functions approximate the changes in coefficients across the mapping slices for each term of the mapping functions.

Coefficient storages in accordance with many embodiments of the invention can store term coefficients that can be used to map and/or transform a source image to a target image. In certain embodiments, term coefficients can be used to compute a set of coefficients for source coordinate functions that can be used to identify source coordinates based on the coordinates for each location of a target image.

In a number of embodiments, distortion correction engines can use term coefficients and/or computed coefficients for source coordinate functions to identify source coordinates based on the coordinates for each location of a target image. In numerous embodiments, distortion correction engines can determine the mappings for each location of the target image and sent with fragment shaders to render a target image (e.g., a frame of video).

Although a specific example of a distortion correction application 1600 is illustrated in FIG. 16, any of a variety of distortion correction applications can be utilized to perform processes for correcting distorted images similar to those described herein as appropriate to the requirements of specific applications in accordance with embodiments of the invention.

Results

Figure 17:
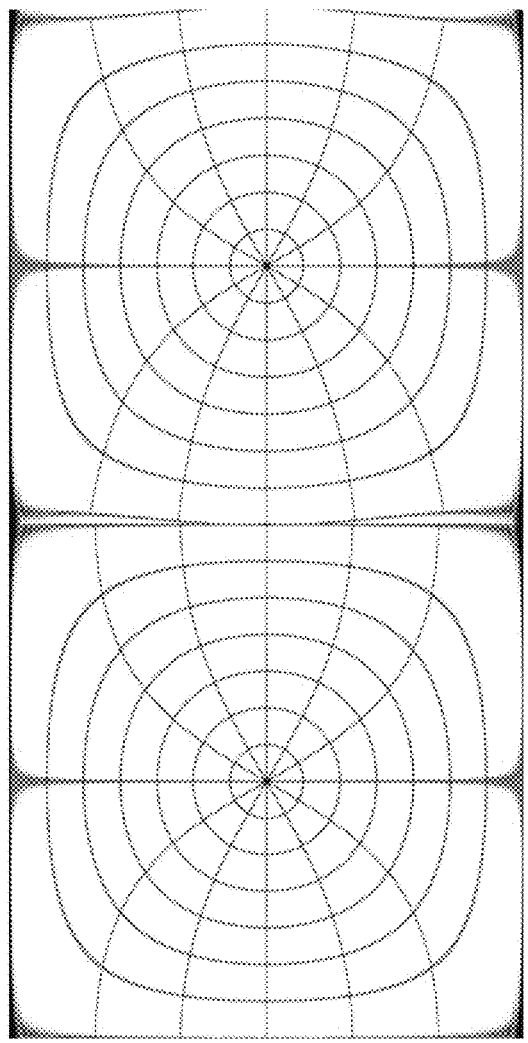
FIG. 17 illustrates a comparison of mappings generated by conventional methods and by polynomial distortion correction processes in accordance with an embodiment of the invention.
Figure 17:
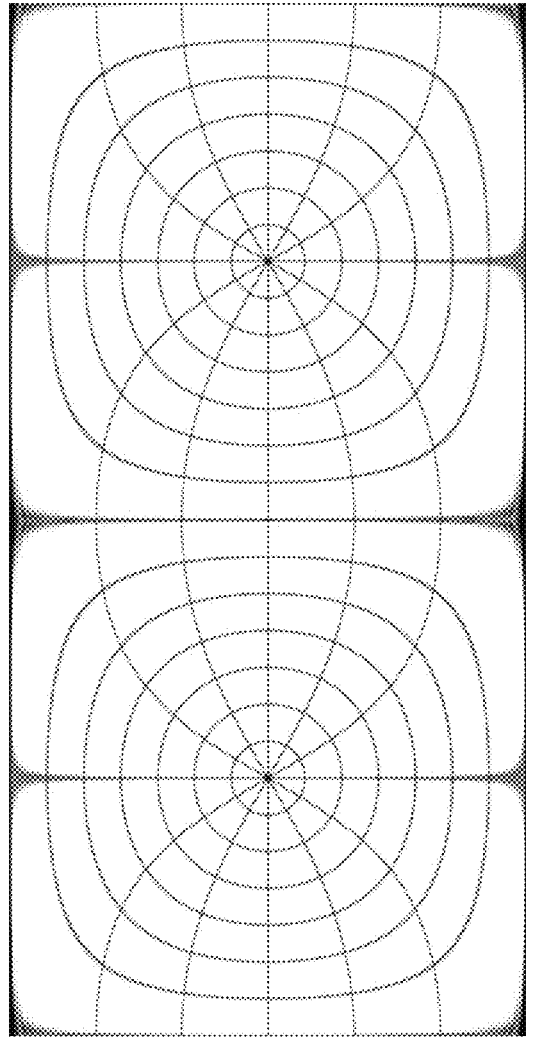

Polynomial distortion correction processes in accordance with some embodiments of the invention can accurately approximate the results of other processor-intensive dewarping processes using far less computation and memory. A comparison of mappings generated by conventional methods and by polynomial distortion correction processes in accordance with an embodiment of the invention are illustrated in FIG. 17. In this example, mapping 1705 was generated using a standard conventional method using trigonometric functions to approximate the physics of a fisheye lens. Mapping 1710 illustrates a mapping generated using polynomial distortion correction processes in accordance with a number of embodiments of the invention. As illustrated in this example, the generated mappings match each other quite closely.

As illustrated in the table below, the maximum absolute difference between the two methods is around 0.5% for the x mapping and 2.6% for the y mapping. This corresponds to 21.5 and 106.1 pixels on their respective axes.

|        | diff  | pxDiff@4K | pxDiff@1080 |
|--------|-------|-----------|-------------|
| pfish.x | 0.005 | 21.552    | 5.682       |
| pfish.y | 0.026 | 106.120   | 27.981      |

Figure 18:
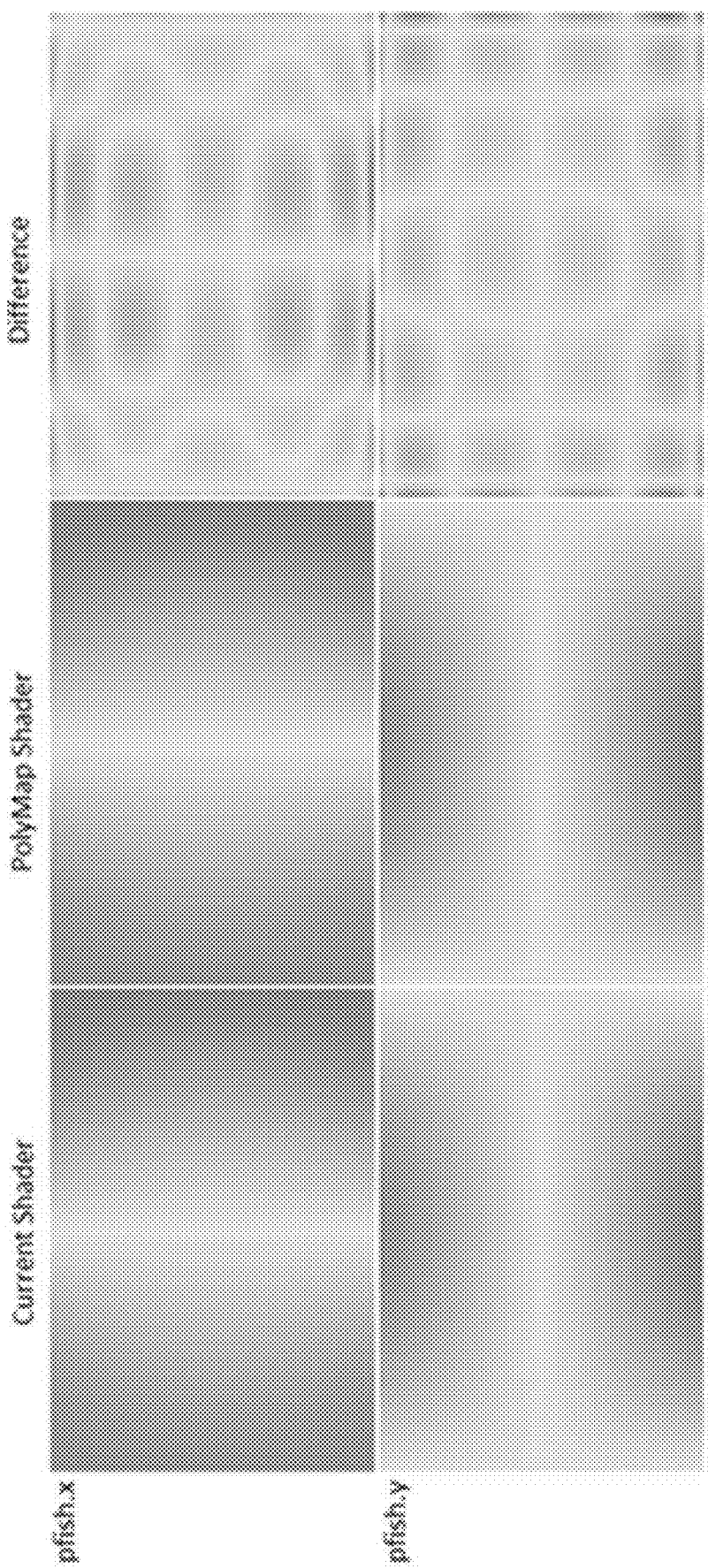
FIG. 18 illustrates an example of a heatmap that illustrates the difference between a conventional method and a polynomial distortion correction process in accordance with an embodiment the invention.

The difference between the two methods can be illustrated with a heatmap that shows where the maximum and minimum errors occur between the two methods. An example of a heatmap that illustrates the difference between a conventional method and a polynomial distortion correction process in accordance with an embodiment of the invention is illustrated in FIG. 18.

Since the error heatmap 1815 shows a regular pattern in the percent errors on both coordinate axes, this indicates that there are higher order effects that are not being accounted for with the low degree polynomials being used to perform these mappings. The regular patterns that emerge in the error heatmap 1815 suggest that higher order terms can be used in the initial x- and y-mapping profiles. With second-degree polynomials, the polynomial distortion correction process had a convergence with the conventional method that was within 2.4%. When the polynomial degree is increased, the convergence increases dramatically. This is because higher degree polynomials in the standard Taylor series expansion will converge better to the desired function.

Systems and methods in accordance with a variety of embodiments of the invention using higher degree polynomials are shown to have a maximum error of 0.05% which is an improvement of 2 orders of magnitude. The maximum amount a pixel will deviate from the current shader designation is 2 pixels on a 4K feed (half a pixel at 1080). This will only occur in very small patches around the perimeter and only on the y-axis. The maximum error on the x-axis is 1 pixel at 4K (0.25 pixels at 1080). In the interior of both the x and y mappings, the maximum is less that ~0.6 pixels at 4K (or 0.15 pixels at 1080).

|        | diff      | pxDiff@4K | pxDiff@1080 |
|--------|-----------|-----------|-------------|
| pfish.x | 2.798E−04 | 1.119E+00 | 3.021E−01   |
| pfish.y | 5.188E−04 | 2.075E+00 | 5.603E−01   |

These polynomial mappings can eliminate 56 million trig function calls, 16 million arctangent calls, and 8 million square root calculations on a 4K resolution frame versus conventional methods. Performing the shift and rescale before calculating the values of the coefficient functions eliminates 480 million arithmetic operations.

Benchmarks of processes in accordance with a number of embodiments of the invention compared to conventional methods suggest a significant algorithmic efficiency gain. A comparison test was performed using Python in a Jupyter notebook on a Windows 10 PC with an 8-core 4.2 GHz Intel i7-7700K CPU. When the two were run for 100 cycles on a 100×100 image, the time to complete each algorithm was measured for each method.

Figure 19:
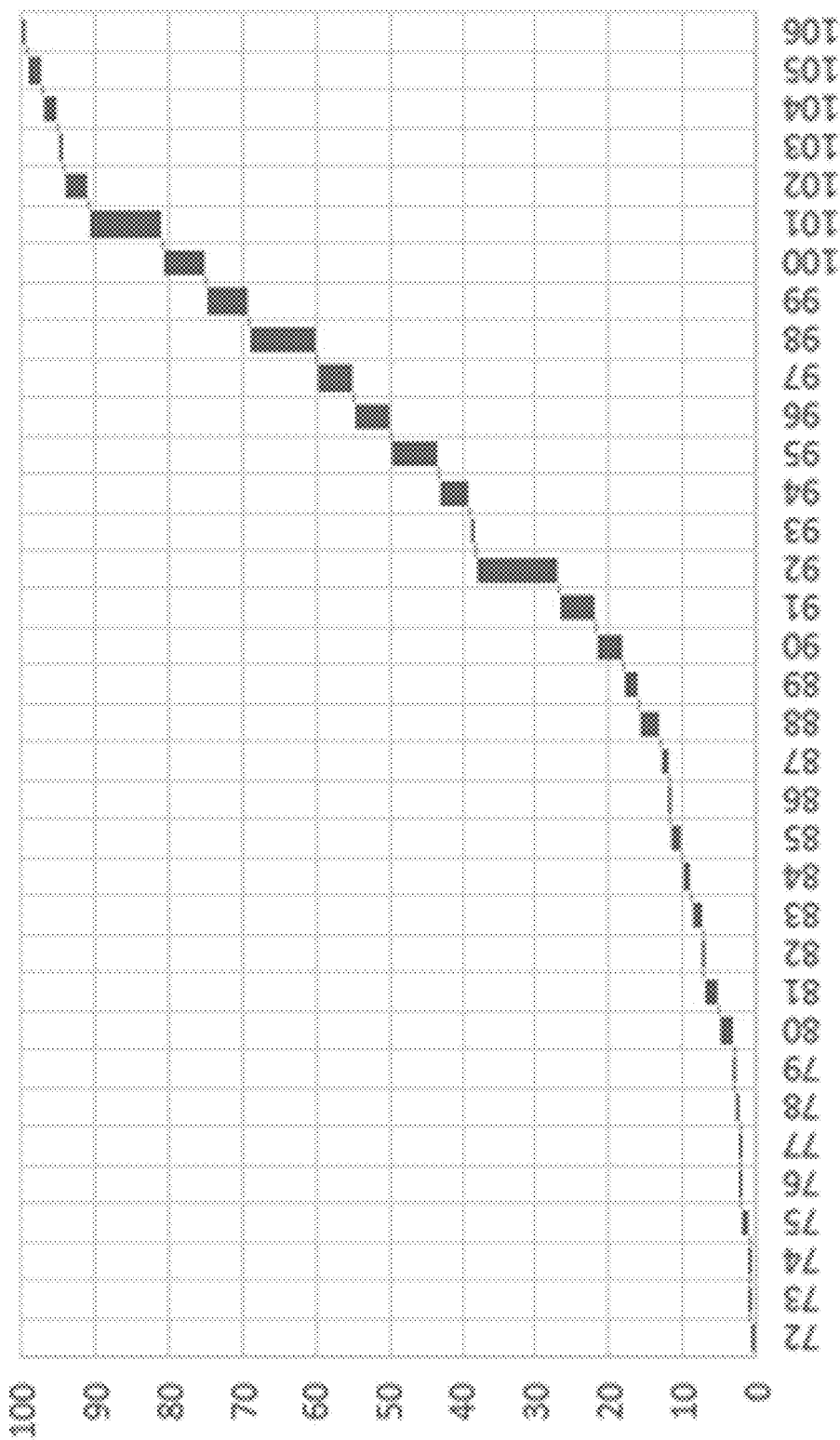
FIG. 19 illustrates a chart illustrating results of a comparison test.

A chart illustrating results of a comparison test are illustrated in FIG. 19. In this chart, the time to complete the conventional method is divided by the time to complete for a polynomial distortion correction process to get the number of times faster the described polynomial distortion correction process is than the conventional method. This test was run 100 times to get an overall sense of the level of improvement. It was shown that 81% of the values fall between 88 and 102 which means that the polynomial distortion correction process generally executed 90-100 times faster than the conventional method. The average was 94.3855 with a standard deviation of 6.8054. The minimum result of 71.8702 showed that the polynomial distortion correction process performed over 70 times faster than the conventional method in all 100 tests, with a maximum (106.1200) of over 100.

As shown in this example, the convergence of the polynomial distortion correction process to the conventional method is within 2 pixels at 4K. As display technology advances beyond 4K resolution, processes in accordance with certain embodiments of the invention can use higher order polynomials to approximate conventional methods, replacing significantly higher numbers of computationally intensive functions and calculations.

Figure 20:
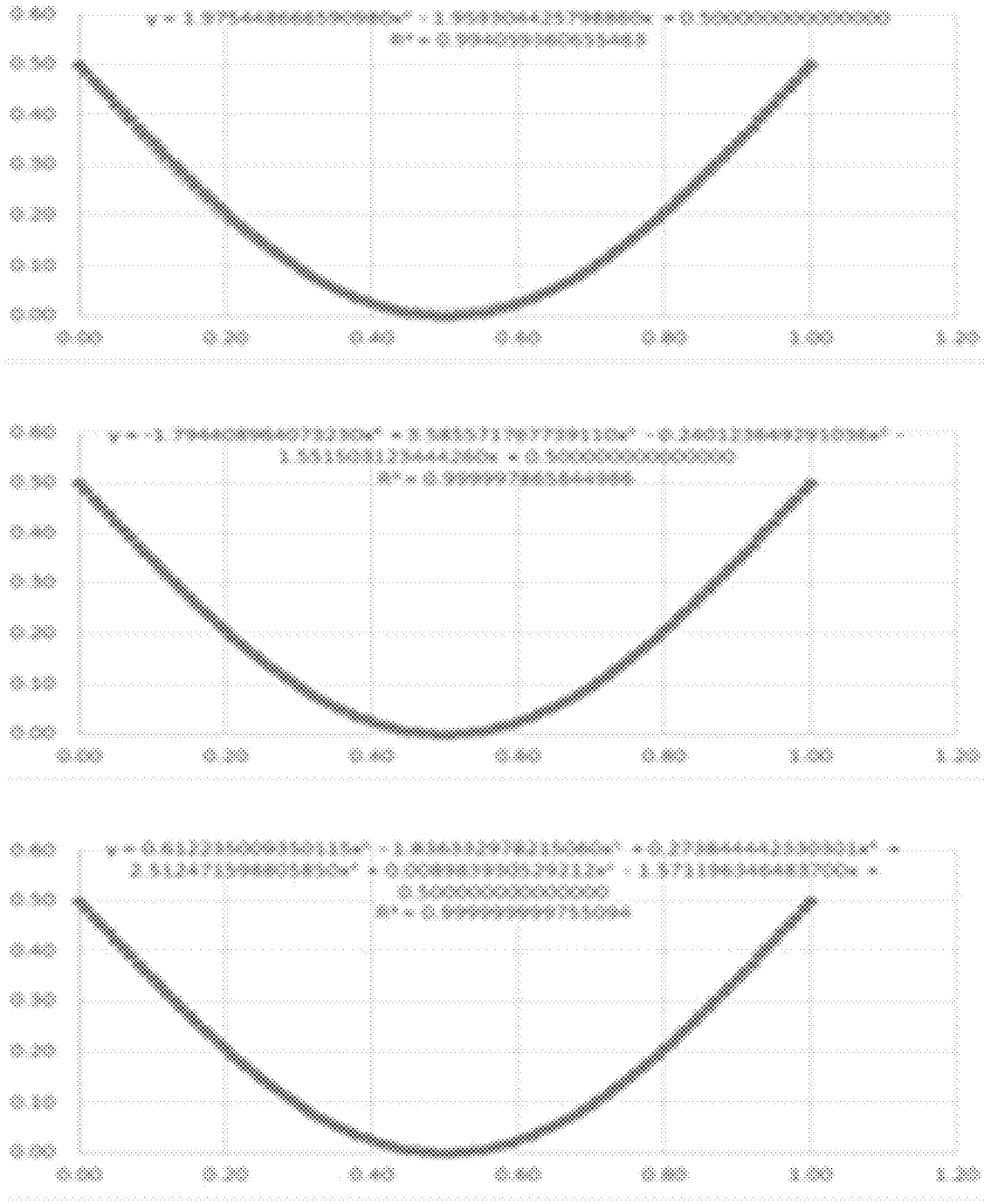
FIG. 20 illustrates charts of comparative curves of the results of a comparison between the polynomial distortion correction process and the conventional method.

Charts of comparative curves of the results of a comparison between the polynomial distortion correction process and the conventional method are illustrated in FIG. 20. The first chart 2005 shows that polynomial distortion correction processes using quadratic and cubic polynomials were within 99.4% of the true values. The second chart 2010 illustrates that increasing the polynomial degree gave results that were within 99.9998% of the conventional method. This is nearly four orders of magnitude better than the formulation of the first chart 2005. The third chart 2015 shows that the addition of higher degree terms could provide 99.99999998% agreement with the conventional method, which is another four orders of magnitude better but comes at the price of increased complexity.

Although specific methods of distortion correction are discussed above, many different methods of distortion correction can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for correcting distorted images, the method comprising:
   generating a set of term coefficients associated with a lens that captured a set of one or more distorted images by:
      generating a set of coordinate maps;
      fitting a set of mapping functions to mapping slices of the coordinate maps;
      fitting a set of mapping coefficient curves to coefficients of the set of mapping functions; and
      determining the set of term coefficients based on coefficients of the set of mapping coefficient curves;
   receiving the set of term coefficients associated with the lens that captured a set of one or more distorted images; and
   mapping each of the set of distorted images to a new target image based on the set of term coefficients.

2. The method of claim 1, wherein:
   the set of term coefficients are generalized term coefficients;
   the method further comprises computing specific term coefficients based on a field of view of the lens; and
   mapping each of the set of distorted images is based on the specific term coefficients.

3. The method of claim 1, wherein mapping slices are rows of a coordinate map.

4. The method of claim 1, wherein the set of mapping coefficient curves include at least one of the group consisting of a quartic polynomial and a quintic polynomial.

5. The method of claim 1, wherein the set of mapping coefficient curves are centered around the origin.

6. The method of claim 1, wherein the one or more distorted images comprise fisheye images.

7. The method of claim 6, wherein the new target image is an equirectangular image.

8. The method of claim 7, wherein mapping each of the set of distorted images comprising using a set of bivariate polynomial functions based on the set of term coefficients.

9. The method of claim 8, wherein the set of bivariate polynomial functions comprises two bivariate polynomial functions.

10. A non-transitory machine readable medium containing processor instructions for correcting distorted images, where execution of the instructions by a processor causes the processor to perform a process that comprises:
    generating the set of term coefficients by:
       generating a set of coordinate maps;
       fitting a set of mapping functions to mapping slices of the coordinate maps;
       fitting a set of mapping coefficient curves to coefficients of the set of mapping functions; and
       determining the set of term coefficients based on coefficients of the set of mapping coefficient curves;
    receiving a set of term coefficients associated with a lens that captured a set of one or more distorted images; and
    mapping each of the set of distorted images to a new target image based on the set of term coefficients.

11. The non-transitory machine readable medium of claim 10, wherein:
    the set of term coefficients are generalized term coefficients;
    the non-transitory machine readable medium further comprises computing specific term coefficients based on a field of view of the lens; and
    mapping each of the set of distorted images is based on the specific term coefficients.

12. The non-transitory machine readable medium of claim 10, wherein mapping slices are rows of a coordinate map.

13. The non-transitory machine readable medium of claim 10, wherein the set of mapping coefficient curves include at least one of the group consisting of a quartic polynomial and a quintic polynomial.

14. The non-transitory machine readable medium of claim 10, wherein the set of mapping coefficient curves are centered around the origin.

15. A method for correcting distorted images, the method comprising:
    generating the set of term coefficients by:
       generating a set of coordinate maps;
       fitting a set of mapping functions to mapping slices of the coordinate maps;
       fitting a set of mapping coefficient curves to coefficients of the set of mapping functions; and
       determining the set of term coefficients based on coefficients of the set of mapping coefficient curves;
    receiving a set of term coefficients associated with a lens that captured a set of one or more distorted images; and
    mapping each of the set of distorted images to a new target image based on the set of term coefficients.

16. The method of claim 15, wherein:
    the set of term coefficients are generalized term coefficients;
    the method further comprises computing specific term coefficients based on a field of view of the lens; and
    mapping each of the set of distorted images is based on the specific term coefficients.

17. The method of claim 15, wherein mapping slices are rows of a coordinate map.

18. The method of claim 15, wherein the set of mapping coefficient curves include at least one of the group consisting of a quartic polynomial and a quintic polynomial.

19. The method of claim 15, wherein the set of mapping coefficient curves are centered around the origin.

* * * * *